(12) United States Patent
Höpken et al.

(10) Patent No.: US 6,715,874 B1
(45) Date of Patent: Apr. 6, 2004

(54) ORGANIC POLYMERS

(75) Inventors: Jens Höpken, Lörrach (DE); Dieter Lohmann, Münchenstein (CH)

(73) Assignee: Novartis AG, Basel (CH)

( * ) Notice: Subject to any disclaimer, the term of this patent is extended or adjusted under 35 U.S.C. 154(b) by 249 days.

(21) Appl. No.: 09/627,807

(22) Filed: Jul. 28, 2000

(30) Foreign Application Priority Data

Feb. 8, 1999 (EP) .............................................. 99115221

(51) Int. Cl.$^7$ ................................................. G02C 7/02
(52) U.S. Cl. ........................ 351/159; 523/107; 264/299; 264/1.32; 528/33; 528/26; 528/29; 528/25; 528/376; 528/30; 568/615; 525/479
(58) Field of Search ............................ 523/107; 528/33, 528/26, 29, 25, 376, 30; 568/615; 525/479; 264/299, 1.32; 351/159

(56) References Cited

U.S. PATENT DOCUMENTS

| 4,725,630 A | * | 2/1988 | Magee et al. |
| 4,818,801 A | | 4/1989 | Rice et al. |
| 5,969,076 A | | 10/1999 | Lai et al. |
| 6,008,317 A | | 12/1999 | Lai et al. |

FOREIGN PATENT DOCUMENTS

| EP | 0291452 | 4/1988 |
| WO | WO 92/09644 | 6/1992 |
| WO | WO 99/12059 | 3/1999 |

OTHER PUBLICATIONS

European Search Report.

* cited by examiner

*Primary Examiner*—Robert Dawson
*Assistant Examiner*—Kuo-Liang Peng
(74) *Attorney, Agent, or Firm*—R. Scott Meece; Jian S. Zhou; Richard I. Gearhart

(57) ABSTRACT

The invention relates to novel crosslinkable copolymers of formula (1)

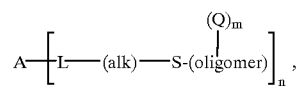

wherein the variables are as defined in the claims. The copolymers of the invention are especially useful for the manufacture of biomedical moldings, for example ophthalmic moldings such as in particular contact lenses.

14 Claims, No Drawings

ORGANIC POLYMERS

The present invention relates to novel crosslinkable copolymers, to a process for the preparation thereof and to the use thereof for the manufacture of mouldings, especially ophthalmic mouldings.

U.S. Pat. Nos. 5,760,100 or 5,807,944 disclose crosslinkable amphiphilic block copolymers comprising a hydrophobic middle block to which are linked two or more hydrophilic blocks. While the materials disclosed therein in general have proven to be effective as bulk material for the manufacture of biomedical articles, the availability, chemical constitution and size of suitable hydrophilic blocks as well as the further processing of the known block copolymers is often problematic. In particular, the control of the segmental length of the hydrophilic segments is often difficult. Therefore, it would be highly desirable to provide more easily accessible hydrophilic blocks of variable chain length having a single functional group undergoing coupling with the hydrophobic segment and one or more different functional groups useful to attach a polymerizable moiety. Such hydrophilic blocks would allow to design specific crosslinkable amphiphilic block copolymers with specific polymer and segmental architectures depending on the desired use. In addition, a simplified manufacture of mouldings from such amphiphilic block copolymers would be desirable which omits time consuming steps such as, for example, the removal of extractables, that are unpolymerized components or compounds that are not firmly anchored in the polymer network, after the polymerization or crosslinking step.

Therefore, it is an object of the invention to provide novel crosslinkable amphiphilic block copolymers, within the application also called prepolymers, which are based on easily accessible hydrophilic blocks with high variability of chemical constitution and segmenral length, and which make it possible to manufacture mouldings, in particular biomedical mouldings such as especially ophthalmic mouldings, in a very efficient manner.

The present invention therefore in one aspect relates to a crosslinkable amphiphilic block copolymer of formula

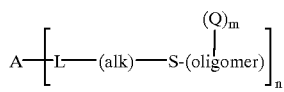
(1)

wherein A is a hydrophobic segment selected from the group consisting of a polysiloxane, a perfluoroalkyl polyether and mixtures thereof, L is is a bivalent linking group of formula —$X_1$—C(O)—NH—R—NH—C(O)—$X_2$— (2a), —$X_1$—C(O)—R—C(O)—$X_2$— (2b), —C(O)—$X_2$— (2c), —$X_1$—C(O)— (2d) or —$X_1$—C(O)—$X_2$— (2e), wherein $X_1$ and $X_2$ are each independently of the other a group —O—, —S— or —$NR_1$—, $R_1$ is hydrogen or $C_1$–$C_4$-alkyl, R is linear or branched $C_1$–$C_{18}$-alkylene or unsubstituted or $C_1$–$C_4$-alkyl- or $C_1$–$C_4$-alkoxy-substituted $C_6$–$C_{10}$-arylene, $C_7$–$C_{18}$-aralkylene, $C_6$–$C_{10}$-arylene-$C_1$–$C_2$-alkylene-$C_6$–$C_{10}$-arylene, $C_3$–$C_8$-cycloalkylene, $C_3$–$C_8$-cycloalkylene-$C_1$–$C_6$-alkylene, $C_3$–$C_8$-cycloalkylene-$C_1$–$C_2$-alkylene-$C_3$–$C_8$-cycloalkylene or $C_1$–$C_6$-alkylene-$C_3$–$C_8$-cycloalkylene-$C_1$–$C_6$-alkylene;

(alk) is $C_2$–$C_{12}$-alkylene;

(oligomer) is the radical of a hydrophilic telomer which is derived from one or more different copolymerizable vinyl monomers;

Q is an organic radical comprising at least one crosslinkable or polymerizable group;

m is an integer from 1 to 4, and n is an integer $\geq 1$.

According to one preferred embodiment of the invention, the segment A comprises a polysiloxane block having terminal alkylene groups of formula

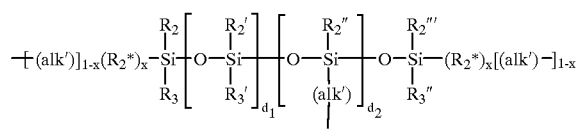
(3)

in which (alk') is alkylene having up to 20 carbon atoms which may be interrupted by —O—; 80–100% of the radicals $R_2$, $R_2'$, $R_2''$, $R_2'''$, $R_2^*$, $R_3$, $R_3'$ and $R_3''$, independently of one another $C_1$–$C_8$-alkyl and 0–20% of the radicals $R_2$, $R_2'$, $R_2''$, $R_2'''$, $R_2^*$, $R_3$, $R_3'$ and $R_3''$, independently of one another, are $C_3$–$C_{12}$-alkenyl, unsubstituted or $C_1$–$C_4$ alkyl- or $C_1$–$C_4$-alkoxy-substituted phenyl, fluoro($C_1$–$C_{18}$-alkyl) or cyano($C_1$–$C_{12}$-alkyl), x is 0 or 1, $d_1$ is an integer of from 5 to 700, $d_2$ is (n−2) if x is 0, and is n if x is 1 wherein n is as defined above, and the sum of ($d_1$+$d_2$) is from 5 to 700.

In a preferred meaning, the sum of ($d_1$+$d_2$) is an integer from 10 to 500, more preferably 10 to 300, particularly preferably 20 to 200 and in particular 25 to 150.

(alk') is preferably $C_2$–$C_8$-alkylene, which may be interrupted by —O— and more preferably $C_2$–$C_6$-alkylene which may be interrupted by —O—. Examples of particular preferred radicals (alk') are linear or branched $C_2$–$C_6$ alkylene or a radical —$(CH_2)_{1-3}$—O—$(CH_2)_{1-3}$—, especially $C_2$–$C_4$-alkylene or a radical —$(CH_2)_{2-3}$—O—$(CH_2)_{2-3}$—.

Preferably the radicals $R_2$, $R_2'$, $R_2''$, $R_2'''$, $R_2^*$, $R_3$, $R_3'$ and $R_3''$ are each independently another $C_1$–$C_6$-alkyl, more preferably each $C_1$–$C_4$-alkyl, more preferably each $C_1$–$C_2$-alkyl and in particular each methyl.

One embodiment of suitable polysiloxane hydrophobic blocks (A) emcompasses a radical of the above formula (3), wherein x is 0, $d_2$ is 0, $d_1$ is an integer from 5 to 700, preferably 10 to 500, more preferably 10 to 300, even more preferably 20 to 200 and in particular preferably 25 to 150, $R_2$, $R_2'$, $R_2''$, $R_2'''$, $R_2^*$, $R_3$, $R_3'$ and $R_3''$ are each independently of one another $C_1$–$C_6$-alkyl and for (alk') the above given meanings and preferences apply.

Another embodiment of suitable polysiloxane hydrophobic blocks (A) emcompasses a radical of the above formula (3), wherein x is 0, $d_2$ is the sum of (n−2) and is $\geq 1$, and for $R_2$, $R_2'$, $R_2''$, $R_2'''$, $R_2^*$, $R_3$, $R_3'$ and $R_3''$, $d_1$ and (alk') the above-given meanings and preferences each apply.

Still another embodiment of suitable polysiloxane hydrophobic blocks (A) emcompasses a radical of the above formula (3), wherein x is 1, $d_2$ is equivalent to n, and for $R_2$, $R_2'$, $R_2''$, $R_2'''$, $R_2^*$, $R_3$, $R_3'$, $d_1$ and $R_3''$ each the above-given meanings and preferences each apply.

According to another embodiment of the invention, the oxygen-permeable polymer in segment A comprises a perfluoroalkyl-polyether block of formula

$$—(E)_k—Z—CF_2—(OCF_2)_{b1}—(OCF_2CF_2)_{b2}—OCF_2—Z—(E)_k \quad (4)$$

in which (b1+b2) is a number in the range from 10 to 100; each Z, independently of the others, is a divalent radical having up to 12 carbon atoms or a bond; each E, independently of the others, is alkoxy, e.g. —(OCH$_2$CH$_2$)$_a$—, where a has a value of from 0 to 2 as a statistical average, and where the link —Z—E— represents the sequence —Z—(OCH$_2$CH$_2$)$_a$—; and k is 0 or 1.

Z is preferably a bond, $C_{1-C8}$-alkylene or —CONH-phenylene, in which the —CO— moiety is linked to a CF$_2$ group. Z is particularly preferably $C_1$–$C_4$-alkylene, in particular methylene.

The perfluoroalkoxy units OCF$_2$ and OCF$_2$CF$_2$ having the indices b1 and b2 in Formula (4) can have a random distribution. The sum of the indices (b1+b2) is preferably a number in the range from 10 to 50, particularly preferably from 10 to 30. The ratio b1:b2 is preferably in the range from 0.5 to 1.5, in particular in the range from 0.8 to 1.2.

In one embodiment of the invention, the segment A may comprise one of the polymers illustrated above, in particular a polysiloxane. According to another embodiment, the polymer in segment A may comprise more than one kind of polymers as illustrated above, e.g., may comprise perfluoroalkylene polyether subsegments and polysiloxane subsegments.

Segments A of the prepolymers of the invention have a mean molecular weight of for example in the range from about 1,000 to about 50,000, preferably in the range from about 1,500 to about 30000 and particularly preferably in the range from about 2,000 to about 20,000.

The linking groups L of formulae (2a)–(2e) are to be understood that the left bond is directed to A and the right bond is directed to (alk).

If X$_1$ or X$_2$ is a group —NR$_1$—, R$_1$ is preferably methyl, ethyl or in particular hydrogen. X$_1$ and X$_2$ are each independently of the other preferably a group —O— 0 —NR$_1$— and more preferably —O— or —NH—

R as alkylene in formula (2b) is preferably linear or branched $C_1$–$C_{12}$-alkylene, more preferably $C_1$–$C_6$-alkylene and most preferably $C_1$–$C_4$-alkylene.

R as alkylene in formula (2a) is preferably a linear or branched $C_3$–$C_{14}$-alkylene radical, more preferably a linear or branched $C_4$–$C_{12}$alkylene radical and most preferably a linear or branched $C_6$–$C_{10}$alkylene radical.

When R is arylene, it is, for example, naphthylene or especially phenylene, each of which may be substituted, for example, by $C_1$–$C_4$-alkyl or by $C_1$–$C_4$-alkoxy. Preferably, R as arylene is 1,3- or 1,4-phenylene that is unsubstituted or substituted by $C_1$–$C_4$-alkyl or by $C_1$–$C_4$-alkoxy in the ortho-position to at least one linkage site.

R as aralkylene is preferably naphthylalkylene and most preferably phenylalkylene. The alkylene group in aralkylene contains preferably from 1 to 12, more preferably from 1 to 6 and most preferably from 1 to 4 carbon atoms. Most preferably, the alkylene group in aralkylene is methylene or ethylene.

When R is cycloalkylene, it is preferably $C_5$–$C_6$cycloalkylene and most preferably cyclohexylene that is unsubstituted or substituted by methyl.

When R is cycloalkylene-alkylene, it is preferably cyclohexylene-$C_1$–$C_4$-alkylene and especially cyclohexylene-$C_1$–$C_4$-alkylene, each unsubstituted or mono- or poly-substituted by $C_1$–$C_4$-alkyl, especially methyl. More preferably, the group cycloalkylene-alkylene is cyclohexylene-ethylene and, most preferably, cyclohexylene-methylene, each unsubstituted or substituted in the cyclohexylene radical by from 1 to 3 methyl groups.

When R is alkylene-cycloalkylene-alkylene, it is preferably $C_1$–$C_4$-alkylene-cyclopentylene-$C_1$–$C_4$-alkylene and especially $C_1$–$C_4$-alkylene-cyclohexylene-$C_1$–$C_4$-alkylene, each unsubstituted or mono- or poly-substituted by $C_1$–$C_4$-alkyl, especially methyl. More preferably, the group alkylene-cycloalkylene-alkylene is ethylene-cyclohexylene-ethylene and, most preferably, is methylene-cyclohexylene-methylene, each unsubstituted or substituted in the cyclohexylene radical by from 1 to 3 methyl groups.

R as $C_3$–$C_8$-cycloalkylene-$C_1$–$C_2$-alkylene-$C_3$–$C_8$-cycloalkylene or $C_6$–$C_{10}$-arylene-$C_1$–$C_2$-alkylene-$C_6$–$C_{10}$arylene is preferably $C_5$–$C_6$-cycloalkylene-methylene-$C_5$–$C_6$-cycloalkylene or phenylene-methylene-phenylene, each of which may be unsubstituted or substituted in the cycloalkyl or phenyl ring by one or more methyl groups.

The radical R in formula (2a) has a symmetrical or, preferably, an asymmetrical structure.

L is preferably a radical of formula (2a). An especially preferred group of linking groups L comprises those of formula (2a), wherein R is linear or branched $C_6$–$C_{10}$alkylene; or cyclohexylene-methylene or cyclohexylene-methylene-cyclohexylene each unsubstituted or substituted in the cyclohexyl moiety by from 1 to 3 methyl groups.

Most preferably the bivalent radical R in formula (2a) is derived from a diisocyanate and in particular from a diisocyanate selected from the group isophorone diisocyanate (IPDI), 4,4'-methylenebis(cyclohexyl isocyanate), 1,6-diisocyanato-2,2,4-trimethyl-n-hexane (TMDI), methylenebis(cyclohexyl-4-isocyanate) and hexamethylene diisocyanate (HMDI).

Further suitable linking groups L comprise, for example, —C(O)O—, —OC(O)—, —C(O)NH— or —NHC(O)—.

The variable (alk) is preferably $C_2$–$C_8$-alkylene, more preferably $C_2$–$C_6$-alkylene, even more preferably $C_{2-C4}$-alkylene and particularly preferably 1,2-ethylene. The alkylene radical (alk) may be branched or preferably linear.

The variable m is, for example, a number from 1 to 4, preferably from 1 to 3 and especially from 1 to 2.

The telomer radical (oligomer)—(Q)$_m$ corresponds, for example, to formula

$$(5)$$

wherein B and B' are each independently of the other a
1,2-ethylene radical derivable from a copolymerizable vinyl monomer that is substituted by a hydrophilic substituent by replacing the vinylic double bond by a single bond, B" is a 1,2-ethylene radical derivable from a copolymerizable vinyl monomer by replacing the vinylic double bond by a single bond, Q is an organic radical comprising at least one crosslinkable or polymerizable group;

p and q are each independently of another an integer from 0 to 150, wherein the total of (p+q) is an integer from 2 to 150, u is, for example, an integer from 1 to 4, and T is a monovalent group that is suitable to act as a polymerization chain-reaction terminator.

T is, for example, hydrogen.

Suitable hydrophilic substituents of the radicals B or B' may be non-ionic, anionic, cationic or zwitterionic substituents. Accordingly, the telomer chain of formula (5) may be a charged chain containing anionic, cationic and/or zwitterionic groups or may be an uncharged chain. In addition, the telomer chain may comprise a copolymeric mixture of uncharged and charged units. The distribution of the charges within the telomer, if present, may be random or blockwise.

In one preferred embodiment of the invention, the telomer radical of formula (5) is composed solely of non-ionic monomer units B and optionally B'.

Suitable non-ionic substituents of B or B' include for example a radical $C_1$–$C_6$-alkyl which is substituted by one or more same or different substituents selected from the group consisting of —OH, $C_1$–$C_4$-alkoxy and —$NR_4R_4'$, wherein $R_4$ and $R_4'$ are each independently of another hydrogen or unsubstituted or hydroxy-substituted $C_1$–$C_6$-alkyl or phenyl; phenyl which is substituted by hydroxy, $C_1$–$C_4$-alkoxy or —$NR_4R_4'$, wherein $R_4$ and $R_4'$ are as defined above; a radical —COOY, wherein Y is $C_1$–$C_{24}$-alkyl which is unsubstituted or substituted, for example, by hydroxy, $C_1$–$C_4$-alkoxy, —O—Si$(CH_3)_3$, —$NR_4R_4'$ wherein $R_4$ and $R_4'$ are as defined above, a radical —O—$(CH_2CH_2O)_{1-24}$—$R_9$ wherein $R_9$ is hydrogen or $C_1$–$C_6$-alkyl, or a radical —NH—C(O)—O—G, wherein —O—G is the radical of a saccharide with 1 to 8 sugar units or is a radical —O—$(CH_2CH_2O)_{1-24}$—$R_9$, wherein $R_9$ is as defined above, or Y is $C_{5-C8}$-cycloalkyl which is unsubstituted or substituted by $C_1$–$C_4$-alkyl or $C_1$–$C_4$-alkoxy, or is unsubstituted or $C_1$–$C_4$-alkyl- or $C_1$–$C_4$-alkoxy-substituted phenyl or $C_7$–$C_{12}$-aralkyl; —CON$Y_1Y_2$ wherein $Y_1$ and $Y_2$ are each independently hydrogen, $C_1$–$C_{12}$-alkyl, which is unsubstituted or substituted for example by hydroxy, $C_1$–$C_4$-alkoxy or a radical —O—$(CH_2CH_2O)_{1-24}$—$R_9$ wherein $R_9$ is as defined above, or $Y_1$ and $Y_2$ together with the adjacent N-atom form a five- or six-membered heterocyclic ring having no additional heteroatom or one additional oxygen or nitrogen atom; a radical —$OY_3$, wherein $Y_3$ is hydrogen; or $C_1$–$C_{12}$-alkyl which is unsubstituted or substituted by —$NR_4R_4'$; or is a radical —C(O)-$C_1$–$C_4$-alkyl; and wherein $R_4$ and $R_4'$ are as defined above; or a five- to seven-membered heterocyclic radical having at least one N-atom and being bound in each case via said nitrogen atom.

Suitable anionic substituents of B or B' include for example $C_1$–$C_6$-alkyl which is substituted by —$SO_3H$, —$OSO_3H$, —$OPO_3H_2$ and —COOH; phenyl which is substituted by one or more same or different substituents selected from the group consisting of -$SO_3H$, —COOH, —OH and —$CH_2$—$SO_3H$; —COOH; a radical —$COOY_4$, wherein $Y_4$ is $C_1$–$C_{24}$-alkyl which is substituted for example by —COOH, —$SO_3H$, —$OSO_3H$, —$OPO_3H_2$ or by a radical —NH—C(O)—O—G' wherein G' is the radical of an anionic carbohydrate; a radical —CON$Y_5Y_6$ wherein Ys is $C_1$–$C_{24}$-alkyl which is substituted by —COOH, —$SO_3H$, —$OSO_3H$, or —$OPO_3H_2$ and $Y_6$ independently has the meaning of $Y_5$ or is hydrogen or $C_1$–$C_{12}$-alkyl; or —$SO_3H$; each in form of the free acid or in form of a salt, for example a sodium, potassium, ammonium or the like salt thereof.

Suitable cationic substituents of B or B' include $C_1$–$C_{12}$-alkyl which is substituted by a radical —$NR_4R_4'R_4''{}_+An^-$, wherein $R_4$, $R_4'$ and $R_4''$ are each independently of another hydrogen or unsubstituted or hydroxy-substituted $C_1$–$C_6$-alkyl or phenyl, and $An^-$ is an anion, for example a biomedical acceptable anion such as a halide; or a radical —C(O)$OY_7$, wherein $Y_7$ is $C_1$–$C_{24}$-alkyl which is substituted by —$NR_4R_4'R_4''{}^{+An-}$ and is further unsubstituted or substituted for example by hydroxy, wherein $R_4$, $R_4'$, $R_4''$ and $An^-$ are as defined above.

Suitable zwitterionic substituents of B or B' include a radical —$R_{10}$—Zw, wherein $R_{10}$ is a direct bond or a functional group, for example a carbonyl, carbonate, amide, ester, dicarboanhydride, dicarboimide, urea or urethane group; and Zw is an aliphatic moiety comprising one anionic and one cationic group each.

The following preferences apply to the hydrophilic substituents of B and B':

(i) Non-ionic Substituents:

Preferred alkyl substituents of B or B' are $C_1$–$C_4$-alkyl, in particular $C_1$–$C_2$-alkyl, which is substituted by one or more substituents selected from the group consisting of —OH and —$NR_4R_4'$, wherein $R_4$ and $R_4'$ are each independently of another hydrogen or $C_1$–$C_4$-alkyl, preferably hydrogen, methyl or ethyl and particularly preferably hydrogen or methyl, for example —$CH_2$—$NH_2$, —$CH_2$—N$(CH_3)_2$.

Preferred phenyl substituents of B or B' are phenyl which is substituted by —$NH_2$ or N($C_1$–$C_2$-alkyl)$_2$ for example o-, m- or p-aminophenyl.

In case that the hydrophilic substituent of B or B' is a radical —COOY, Y as optionally substituted alkyl is preferably $C_1$–$C_6$-alkyl, more preferably $C_1$–$C_4$-alkyl, even more preferably $C_1$–$C_3$-alkyl and particularly preferably methyl or ethyl, each of which being unsubstituted or substituted as mentioned above. In case that the alkyl radical Y is substituted by —$NR_4R_4'$, the above-given meanings and preferences apply for $R_4$ and $R_4'$. Examples of suitable saccharide substituents —O—G of the alkyl radical Y that is substituted by —NH—C(O)—O—G are the radical of a mono- or disaccharide, for example glucose, acetyl glucose, methyl glucose, glucosamine, N-acetyl glucosamine, glucono lactone, mannose, galactose, galactosamine, N-acetyl galactosamine, fructose, maltose, lactose, fucose, saccharose or trehalose, the radical of an anhydrosaccharide such as levoglucosan, the radical of a glucosid such as octylglucosid, the radical of a sugar alcohol such as sorbitol, the radical of a sugar acid derivative such as lactobionic acid amide, or the radical of an oligosaccharide with a maximum of 8 sugar units, for example fragments of a cyclodextrin, starch, chitosan, maltotriose or maltohexaose. The radical —O—G preferably denotes the radical of a mono- or disaccharide or the radical of a cyclodextrin fragment with a maximum of 8 sugar units. Particular preferred saccharide radicals —O—G are the radical of trehalose or the radical of a cyclodextrin fragment. In case that the alkyl radical Y is substituted by a radical —O—$(CH_2CH_2O)_{1-24}$—$R_9$ or —NH—C(O)—O—G wherein —O—G is —O—$(CH_2CH_2O)_{1-24}$—$R_9$, the number of $(CH_2CH_2O)$ units is preferably from 1 to 12 in each case and more preferably from 2 to 8. $R_9$ is preferably $C_1$–$C_2$-alkyl or in particular hydrogen. Y as $C_{5-C8}$-cycloalkyl is for example cyclopentyl or preferably cyclohexyl, each of which being unsubstituted or substituted for example by 1 to 3 $C_3$–$C_2$-alkyl groups Y as $C_{7-C12}$-aralkyl is for example benzyl.

Preferred nonionic radicals —COOY are those wherein Y is $C_1$–$C_3$-alkyl; or $C_2$–$C_4$-alkyl which is substituted by one or two substituents selected from the group consisting of hydroxy; $C_1$–$C_2$-alkoxy; —O—Si$(CH_3)_3$; and —$NR_4R_4'$ wherein $R_4$ and $R_4'$ are each independently of another hydrogen or $C_1$–$C_4$-alkyl; or Y is a radical —$CH_2CH_2$—O—$(CH_2CH_2O)_{1-2}$—H; or is a radical —$C_{2-C4}$-alkylene-NH—C(O)—O—G, wherein —O—G is the radical of a saccharide.

More preferred non-ionic radicals —COOY are those wherein Y is $C_3$–$C_2$-alkyl; or $C_2$–$C_4$-alkyl which is substituted by one or two substituents selected from the group consisting of —OH and —$NR_4R_4'$ wherein $R_4$ and $R_4'$ are each independently of another hydrogen or $C_1$–$C_2$-alkyl; or a radical —$CH_2CH_2$—O—$(CH_2CH_2O)_{1-2}$—H; or is a radical —$C_{2-C4}$-alkylene-NH—C(O)—O—G wherein —O—G is the radical of a saccharide.

Particularly preferred radicals —COOY comprise those wherein Y is $C_1$–$C_2$-alkyl, particularly methyl; or $C_{2-C3}$-alkyl, which is unsubstituted or substituted by hydroxy or N,N-di-$C_1$–$C_2$-alkylamino, or is a radical —$CH_2CH_2$—O—$(CH_2CH_2O)_{1-3}$—H or —$C_2$–$C_3$-alkylene-NH—C(O)—O—G wherein —O—G is the radical of trehalose or the radical of a cyclodextrin fragment with a maximum of 8 sugar units.

Preferred non-ionic substituents —C(O)—$NY_1Y_2$ of B or B' are those wherein $Y_1$ and $Y_2$ are each independently of the other hydrogen or $C_1$–$C_6$-alkyl which is unsubstituted or substituted by hydroxy; or $Y_1$ and $Y_2$ together with the adjacent N-atom form a heterocyclic 6-membered ring having no further heteroatom or having one further N- or O-atom. Even more preferred meanings of $Y_1$ and $Y_2$, independently of each other, are hydrogen or $C_1$–$C_4$-alkyl which is unsubstituted or substituted by hydroxy; or $Y_1$ and $Y_2$ together with the adjacent N-atom form a N—$C_1$–$C_2$-alkylpiperazino or morpholino ring. Particularly preferred non-ionic radicals —C(O)—$NY_1Y_2$ are those wherein $Y_1$ and $Y_2$ are each independently of the other hydrogen, $C_3$–$C_2$-alkyl or hydroxy—$C_1$–$C_2$-alkyl; or $Y_1$ and $Y_2$ together with the adjacent N-atom form a morpholino ring.

Preferred non-ionic substituents —$OY_3$ of B or B' are those wherein $Y_3$ is hydrogen, $C_1$–$C_4$-alkyl which is unsubstituted or substituted by —$NH_2$ or —$N(C_1$–$C_2$-alkyl$)_2$, or is a group —$C(O)C_1$–$C_2$-alkyl. $Y_3$ is particularly preferred hydrogen or acetyl.

Preferred non-ionic heterocyclic substituents of B or B' are a 5- or 6-membered heteroaromatic or heteroaliphatic radical having one N-atom and in addition no further heteroatom or an additional N- or O- heteroatom, or is a 5 to 7-membered lactame. Examples of such heterocyclic radicals are N-pyrrolidonyl, 2- or 4-pyridinyl, 2-methyl pyridin-5-yl, 2-, 3- oder 4-hydroxypyridinyl N-ε-caprolactamyl, N-imidazolyl, 2-methylimidazol-1-yl, N-morpholinyl or 4-N-methylpiperazin-1-yl, particularly N-morpholinyl or N-pyrrolidonyl.

A group of preferred non-ionic substituents of B or B' comprises $C_1$–$C_2$-alkyl, which is substituted by —OH or —$NR_4R_4'$, wherein $R_4$ and $R_4'$ are each independently of the other hydrogen or $C_1$–$C_2$-alkyl; a radical —COOY wherein Y is $C_1$–$C_3$-alkyl; $C_2$–$C_4$-alkyl which is substituted by —OH, —$NR_4R_4'$ wherein $R_4$ and $R_4'$ are each independently of another hydrogen or $C_1$–$C_2$-alkyl, or Y is a radical —$CH_2CH_2$—O—$(CH_2CH_2O)_{2-8}$—H or —$C_2$–$C_4$-alkylene-NH—C(O)—O—G wherein —O—G is the radical of a saccharide; a radical —C(O)—$NY_1Y_2$, wherein $Y_1$ and $Y_2$ are each independently of the other hydrogen or $C_1$–$C_6$-alkyl which is unsubstituted or substituted by hydroxy, or $Y_1$ and $Y_2$ together with the adjacent N-atom form a heterocyclic 6-membered ring having no further heteroatom or having one further N- or O-atom; a radical —$OY_3$, wherein $Y_3$ is hydrogen, $C_1$–$C_4$-alkyl which is unsubstituted or substituted by —$NH_2$ or —$N(C_1$–$C_2$-alkyl$)_2$, or is a group —C(O) $C_1$–$C_2$-alkyl; or a 5- or 6-membered heteroaromatic or heteroaliphatic radical having one N-atom and in addition no further heteroatom or an additional N-, O- or S-heteroatom, or a 5 to 7-membered lactame.

A group of more preferred non-ionic substituents of B or B' comprises a radical —COOY, wherein Y is $C_3$–$C_2$-alkyl, $C_2$–$C_3$-alkyl, which is substituted by hydroxy, amino or N,N-di-$C_1$–$C_2$-alkylamino, or is a radical —$CH_2CH_2$—O—$(CH_2CH_2O)_{2-8}$—H or —$C_2$–$C_4$-alkylene-NH—C(O)—O—G wherein —O—G is the radical of trehalose or a cyclodextrin fragment with a maximum of 8 sugar units; a radical —CO—$NY_1Y_2$, wherein $Y_1$ and $Y_2$ are each independently of the other hydrogen or $C_1$–$C_4$-alkyl which is unsubstituted or substituted by hydroxy, or $Y_1$ and $Y_2$ together with the adjacent N-atom form a N—$C_1$–$C_2$-alkylpiperazino or morpholino ring; or a heterocyclic radical selected from the group consisting of N-pyrrolidonyl, 2- or 4-pyridinyl, 2-methylpyridin-5-yl, 2-, 3- oder 4-hydroxypyridinyl, N-ε-caprolactamyl, N-imidazolyl, 2-methylimidazol-1-yl, N-morpholinyl and 4-N-methylpiperazin-1-yl.

A particularly preferred group of non-ionic substituents of B or B' comprises the radicals —COO—

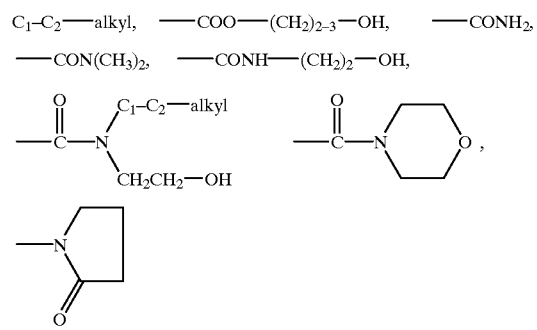

and —$COO(CH_2)_{2-4}$—NHC(O)—O—G wherein —O—G is the radical of trehalose or a cyclodextrin fragment with a maximum of 8 sugar units. Particularly preferred non-ionic substituents of B and B' are

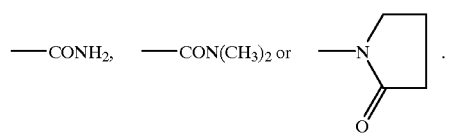

(ii) Anionic Substituents:

Preferred anionic substituents of B or B' are $C_1$–$C_4$-alkyl, in particular $C_1$–$C_2$-alkyl, which is substituted by one or more substituents selected from the group consisting of —$SO_3H$ and —$OPO_3H_2$, for example —$CH_2$—$SO_3H$; phenyl which is substituted by —$SO_3H$ or sulfomethyl, for example o-, m- or p-sulfophenyl or o-, m- or p-sulfomethylphenyl; —COOH; a radical —$COOY_4$, wherein $Y_4$ is $C_2$–$C_6$-alkyl which is substituted by —COOH, —$SO_3H$, —$OSO_3H$, —$OPO_3H_2$, or by a radical —NH—C(O)—O—G' wherein G' is the radical of lactobionic acid, hyaluronic acid or sialic acid, in particular $C_2$–$C_4$-alkyl which is substituted by —$SO_3H$ or —$OSO_3H$; a radical —$CONY_5Y_6$ wherein $Y_5$ is $C_1$–$C_6$-alkyl substituted by sulfo, in particular $C_2$–$C_4$-alkyl substituted by sulfo, and $Y_6$ is hydrogen, for example the radical —C(O)—NH—$C(CH_3)_2$—$CH_2$—SO3H; or —$SO_3H$; or a suitable salt thereof. Particular preferred anionic substituents of B or B' are —COOH, —$SO_3H$, o-, m- or p-sulfophenyl, o-, m- or p-sulfomethylphenyl, a radical —$CONY_5Y_6$ wherein $Y_5$ is $C_2$–$C_4$-alkyl substituted by sulfo, and $Y_6$ is hydrogen, or a biomedical acceptable salt thereof, for example a sodium or ammonium salt.

(iii) Cationic Substituents:

Preferred cationic substituents of B or B' are $C_1$–$C_4$-alkyl, in particular $C_1$–$C_2$-alkyl, which is in each case substituted by —$NR_9R_9'R_9''^+An^-$; or a radical —$C(O)OY_7$ wherein $Y_7$ is $C_2$–$C_6$-alkyl, in particular $C_2$–$C_4$-alkyl, which is in each case substituted by —$NR_4R_4'R_4''^+An^-$ and is further unsubstituted or substituted by hydroxy $R_4$, $R_4'$ and $R_4''$ are each independently of another preferably hydrogen or $C_1$–$C_4$-alkyl, more preferably methyl or ethyl and particularly preferably methyl. Examples of suitable anions $An^-$ are $Hal^-$, wherein Hal is halogen, for example $Br^-$, $F^-$, $J^-$ or particularly $Cl^-$, furthermore $HCO_3^-$, $CO_3^{2-}$, $H_2PO_3^-$, $HPO_3^{2-}$, $PO_3^{3-}$, $HSO_4^-$, $SO_4^{2-}$ or the radical of an organic acid such as $OCOCH_3^-$ and the like. A particularly preferred cationic substituent of B or B' is a radical —$C(O)OY_7$ wherein $Y_7$ is $C_2$–$C_4$-alkyl, which is substituted by —$N(C_1$–$C_2$-alkyl$)_3^+An^-$ and is further substituted by hydroxy, and $An^-$ is an anion, for example the radical —$C(O)O$—$CH_2$—$CH(OH)$—$CH_2$—$N(CH_3)_3^+An^-$.

(iv) Zwitterionic Substituents —$R_{10}$—Zw:

$R_{10}$ is a preferably a carbonyl, ester or amide functional group and more preferably an ester group —$C(O)$—$O$—.

Suitable anionic groups of the moiety Zw are for example —$COO^-$, —$SO_3^-$, —$OSO_3^-$, —$OPO_3H^-$ or bivalent —$O$—$PO_2^-$— or —$O$—$PO_2^-$—$O$—, preferably a group —$COO^-$ or —$SO_3^-$ or a bivalent group —$O$—$PO_2^-$—, and in particular a group —$SO_3^-$.

Suitable cationic groups of the moiety Zw are for example a group —$NR_4R_4'R_4''^+$ or a bivalent group —$NR_4R_4'^+$—, wherein $R_4$, $R_4'$ and $R_4''$ are as defined above, and are each independently of the other, preferably hydrogen or $C_1$–$C_6$-alkyl, preferably hydrogen or $C_1$–$C_4$-alkyl and most preferably each methyl or ethyl.

The moiety Zw is for example $C_2$–$C_{30}$-alkyl, preferably $C_2$–$C_{12}$-alkyl, and more preferably $C_3$–$C_8$-alkyl, which is in each case uninterrupted or interrupted by —O—and substituted or interrupted by one of the above-mentioned anionic and cationic groups each, and, in addition, is further unsubstituted or substituted by a radical —$OY_8$, wherein $Y_8$ is hydrogen or the acyl radical of a carboxylic acid.

$Y_8$ is preferably hydrogen or the acyl radical of a higher fatty acid.

Zw is preferably $C_2$–$C_{12}$-alkyl and even more preferably $C_3$–$C_8$-alkyl which is substituted or interrupted by one of the above-mentioned anionic and cationic groups each, and in addition may be further substituted by a radical —$OY_8$.

A preferred group of zwitter-ionic substituents —$R_3$—Z corresponds to the formula —C(O)O-(alk''')-N(R_4)_2^+-(alk*)-An^- or —C(O)O-(alk''')-O—PO_2^-—(O)_{0-1}-(alk''')-N(R_4)_3^+ wherein $R_9$ is hydrogen or $C_1$–$C_6$-alkyl; $An^-$ is an anionic group —$COO^-$, —$SO_3^-$, —$OSO_3^-$ or —$OPO_3H^-$, preferably —$COO^-$ or —$SO_3^-$ and most preferably —$SO_3^-$, alk* is $C_1$–$C_{12}$-alkylene, (alk") is $C_2$–$C_{24}$-alkylene which is unsubstituted or substituted by a radical —$OY_8$, $Y_8$ is hydrogen or the acyl radical of a carboxylic acid, and (alk''') is $C_2$–$C_8$-alkylene.

(alk*) is preferably $C_2$–$C_8$-alkylene, more preferably $C_2$–$C_6$-alkylene and most preferably $C_2$–$C_4$-alkylene. (alk") is preferably $C_2$–$C_{12}$-alkylene, more preferably $C_2$–$C_6$-alkylene and particularly preferably $C_2$–$C_3$-alkylene which is in each case unsubstituted or substituted by hydroxy or by a radical —$OY_8$. (alk''') is preferably $C_2$–$C_4$-alkylene and more preferably $C_2$–$C_3$-alkylene. $R_9$ is hydrogen or $C_1$–$C_4$-alkyl, more preferably methyl or ethyl and particularly preferably methyl. A preferred zwitterionic substituent of B or B' is of formula

—C(O)O—CH_2—CH(OY_8)—CH_2—O—PO_2^-—(CH_2)_2—N(CH_3)_3^+, wherein $Y_8$ is hydrogen or the acyl radical of a higher fatty acid.

B denotes for example a radical of formula

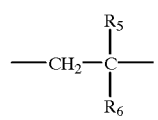

(6a)

or

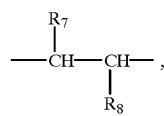

(6b)

preferably a radical of formula (6a), wherein $R_5$ is hydrogen or $C_1$–$C_4$-alkyl, preferably hydrogen or methyl; $R_6$ is a hydrophilic substituent, wherein the above given meanings and preferences apply; $R_7$ is $C_1$–$C_4$-alkyl, phenyl or a radical —$C(O)OY_9$, wherein $Y_9$ is hydrogen or unsubstituted or hydroxy-substituted $C_1$–$C_4$-alkyl; and $R_8$ is a radical —$C(O)Y_9'$, or —$CH_2$—$C(O)OY_9'$ wherein $Y_9'$ independently has the meaning of $Y_9$.

$R_7$ is preferably $C_1$–$C_2$-alkyl, phenyl or a group —$C(O)OY_9$. $R_8$ is preferably a group —$C(O)OY_9'$ or —$CH_2$—$C(O)OY_9'$ wherein $Y_9$ and $Y_9'$ are each independently of the other hydrogen, $C_1$–$C_2$-alkyl or hydroxy-$C_1$–$C_2$-alkyl. Particularly preferred —$CHR_7$-$CHR_8$- units according to the invention are those wherein $R_7$ is methyl or a group —$C(O)OY_9$ and $R_8$ is a group —$C(O)OY_9'$ or —$CH_2$—$C(O)OY_9'$ wherein $Y_9$ and $Y_9'$ are each hydrogen, $C_1$–$C_2$-alkyl or hydroxy-$C_1$–$C_2$-alkyl.

B' independently may have one of the meanings given above for B.

The crosslinkable or polymerizable group contained in Q is preferably an ethylenically unsaturated C—C double bond. A suitable substituent Q of the radical (oligomer) or B" is, for example, a radical of the formula —(R_{11})_t—X—Q_1    (7), wherein $R_{11}$ is $C_1$–$C_8$-alkylene or a radical of formula —C(O)—X_3-Alk—    (8a), —C(O)—O-Alk'-NH—C(O)—O—(CH_2CH_2O)_g—CH_2CH_2-(8b) or —C(O)—O-Alk'-NH—C(O)—O—G_1—    (8c), Alk is $C_2$–$C_{12}$-alkylene which is unsubstituted or substituted, for example, by hydroxy or a radical —$N(R_{12})_3^+An^-$ wherein $R_{12}$ is hydrogen or $C_1$–$C_4$-alkyl and $An^-$ is an anion, Alk' is $C_2$–$C_{12}$-alkylene, $X_3$ is —O— or —$NR_{13}$—, $R_{13}$ is hydrogen or $C_1$–$C_4$-alkyl, t is an integer of 0 or 1, g is an integer from 1 to 23, $G_1$ independently has the meaning of the saccharide radical G reduced by one hydroxy group; X is a group —O—, —S—, —$NR_{13}'$— or —$N(R_{13}')_2^+$—$An^-$ wherein $R_{13}'$ is hydrogen or $C_1$–$C_4$-alkyl and $An^-$ is an anion, $Q_1$ is, for example, a radical $R_{14}$ as defined below or is a radical of formula

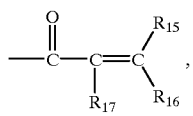
(9a)

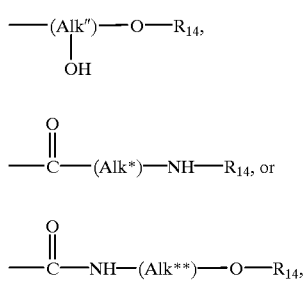
(9b)

(9c)

(Alk″) is linear or branched $C_3$–$C_6$-alkylene, (Alk*) is linear or branched $C_1$–$C_6$-alkylene, (Alk**) is linear or branched $C_2$–$C_{12}$-alkylene, and $R_{14}$ is, for example, a radical of formula

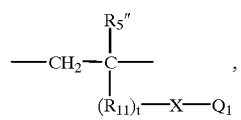
(10)

wherein $R_{17}$ is hydrogen, $C_1$–$C_4$-alkyl or halogen, and each of $R_{15}$, and $R_{16}$ independently of the other is hydrogen, $C_1$–$C_4$-alkyl, phenyl, carboxy or halogen.

$R_{11}$ as alkylene is preferably methylene. If $R_{11}$ is a radical of formula (8a), (Alk) is preferably $C_2$–$C_6$-alkylene, more preferably $C_2$–$C_4$-alkylene and in particular ethylene; and $X_3$ is preferably —NH—, —N($C_1$–$C_2$-alkyl)— or —O—, in particular —NH— or —N($C_1$–$C_2$-alkyl)—. If $R_{11}$ is a radical of formula (8b), (Alk') is preferably $C_{2-C6}$alkylene, more preferably $C_{2-C4}$-alkylene and in particular ethylene; and g is preferably an integer of from 1 to 12 and especially from 2 to 8. If $R_{11}$ is a radical of formula (8c), for (Alk') the above given preferences apply; and —$OG_1$ is preferably the radical of trehalose or a cyclodextrin fragment with a maximum of 8 sugar units each reduced by one hydroxy group.

$R_{11}$ is preferably a radical of formula (8a). The variable t is preferably the number 1. X is preferably —O— or —NH—, in particular —O—.

$R_{17}$ is preferably hydrogen, methyl or chlorine and most preferably hydrogen or methyl. Each of $R_{15}$ and $R_{16}$ independently of the other is preferably hydrogen, carboxy, chlorine, methyl or phenyl. In a preferred embodiment of the invention, $R_{15}$ is hydrogen or methyl and $R_{16}$ is hydrogen or carboxy. Most preferably, $R_{15}$ and $R_{16}$ are each hydrogen.

Examples of suitable radicals $R_{14}$ are vinylcarbonyl, 1-methylvinylcarbonyl, styrylcarbonyl, 2-carboxyvinylcarbonyl, 2-chloro-2-carboxyvinylcarbonyl, 1,2-dichloro-2-carboxyvinylcarbonyl, 1,2-dimethyl-2-carboxyvinylcarbonyl and 2-methyl-2-carboxyvinylcarbonyl.

Especially preferred radicals $R_{14}$ correspond to formula (10) wherein $R_{17}$ is hydrogen or methyl, $R_{15}$ is carboxy or particularly hydrogen, and $R_{16}$ is hydrogen, methyl, chlorine or phenyl, in particular hydrogen.

The radical -[(Alk″)-OH]— in formula (9a) is preferably 2-hydroxy-1,3-propylene. (Alk*) is preferably $C_1$–$C_3$-alkylene, for example methylene or in particular 1,1-dimethylmethylene. (Alk**) is preferably $C_2$–$C_6$-alkylene, more preferably $C_2$–$C_4$-alkylene and in particular ethylene. $Q_1$ is preferably a radical $R_{14}$ of formula (10) or a radical of formulae (9b) or (9c), in particular a radical of formula (9c).

Especially preferred radicals —$Q_1$ correspond to formula

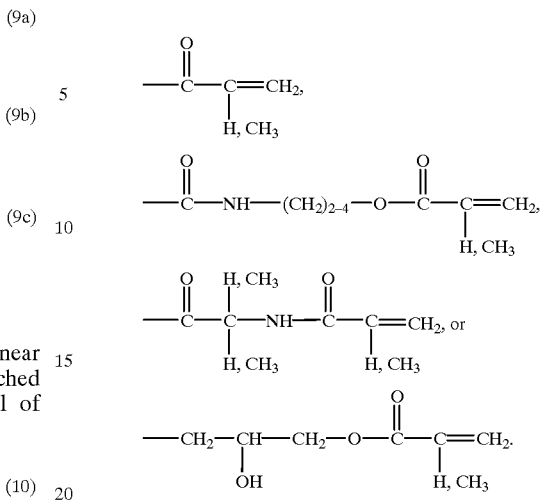

A suitable moiety [B″—Q] in formula (5) corresponds, for example, to formula (6c)

wherein $R_5″$ is hydrogen or $C_1$–$C_4$-alkyl, preferably hydrogen or methyl, and for $Q_1$, X, $R_{11}$ and t each the above given meanings and preferences apply. An especially preferred moiety [B″—Q] of formula (5) corresponds to the formula (6c) above, wherein t is 1, $R_{11}$ is a radical of the formula (8a) above, preferably a radical —CON($C_1$–$C_2$-alkyl)—$CH_2$—$CH_2$— or —CONH—$CH_2$—$CH_2$—, X is —O—, and $Q_1$ is a radical

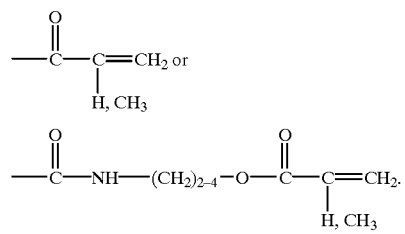

The total of (p+q) is, for example, an integer from 2 to 150, more preferably from 5 to 100, even more preferably from 5 to 75 and particularly preferably from 10 to 50. u is preferably a number from 1 to 3, and especially from 1 to 2. In one preferred embodiment of the invention u is a number from 1 to 2, q is 0, and p is an integer from 1 to 149, preferably from 3 to 99, more preferably from 4 to 74 and particularly preferably from 9 to 49. In another preferred embodiment of the invention u is a number from 1 to 2, p and q are each independently an integer of $\geq 1$ and the sum of (p+q) is an integer from 2 to 149, preferably from 3 to 99, more preferably from 4 to 74 and especially from 9 to 49.

The hydrophilic blocks, for example, of formula (5) have an weight average molecular weight of, for example, 200 to 20000, preferably 250 to 12500, more preferably from 350 to 5000, and in particular 500 to 2500.

The variable n in formula (1) is for example an integer from 1 to 20, preferably from 1 to 10, more preferably from 2 to 8 and even more preferably from 2 to 6. One especially preferred embodiment of the invention relates to block copolymers of formula (1), wherein n is the number 2. Another embodiment relates to block copolymers of formula (1), wherein n is an integer from 3 to 8 and in particular 4 to 6.

The structure of the crosslinkable copolymers of the invention may vary within wide limits. They may thus consist in one embodiment of one segment A and one segment -[L-(alk)-S-(oligomer)-(Q)$_m$] only (diblock copolymers), or of one segment A and two segments -(alk)-S-(oligomer)-(Q)$_m$ linked to its termini by the linking group L (triblock copolymers, or may have a comb-type structure wherein several fragments -[L-(alk)-S-(oligomer)-(Q)$_m$] are pendent from one segment A (comb-block copolymers), wherein A, L, (alk), (oligomer) and (Q)$_m$ each have the above-given meaning.

Formulae (3), (4) and (5) are to be understood as a statistic description of the respective compounds and radicals, that is to say the orientation and sequence of the units are not fixed in any way by said formulae. In addition, the value of m or u in formulae (1) and (1a) is a statistically one which indicates that for a given number of n segments -[L-(alk)-S-(oligomer)] within a copolymer of formula (1) each of said segments statistically comprises m or u units Q or Q$_1$.

One group of preferred amphiphilic block copolymers of the invention are triblock copolymers of formula

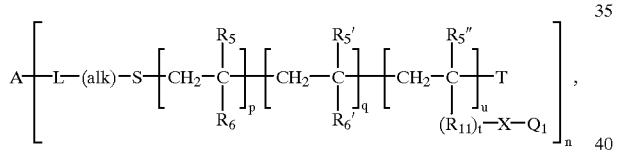

(1a)

wherein R$_{15}$' independently has the meaning of R$_5$, R$_6$' independently has the meaning of R$_6$, n is 2, and for A, L, (alk), R$_5$, R$_5$", R$_6$, R$_6$', R$_{11}$, X, Q$_1$, T, p, q, u and t each the above given meanings and preferences apply.

The block copolymers of formula (1) may be prepared by methods known per se. For example, in a first step there is provided a compound of formula

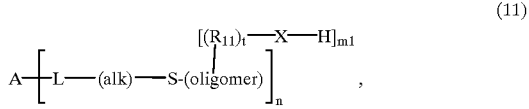

(11)

wherein A, L, (alk), (oligomer), R$_{11}$, X, n und t each have the above given meaning and m1 is an integer of ≧1, for example an integer from 1 to 150, which is then reacted with about (n·m) molar equivalents of, for example, a compound of formula

R$_{14}$—Hal (12a),

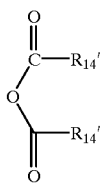

(12b)

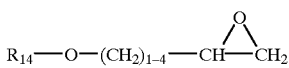

(12c)

R$_{14}$—O—(CH$_2$)$_{1-4}$—CH—CH$_2$

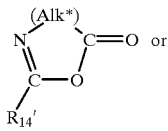

(12d)

=O or

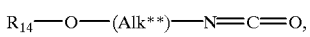

(12e)

R$_{14}$—O—(Alk**)—N=C=O, wherein Hal is halogen, in particular bromine or chlorine, R$_{14}$' has the meaning of R$_{14}$ reduced by the carbonyl group, and R$_{14}$, (Alk*) and (Alk**) are each as defined above.

Preferably, the oligomer portion of the compound of formula (11) is a homopolymer or copolymer derived from one or two hydrophilic ethylenically unsaturated monomers, wherein at least one of said monomers comprises a functional group that is coreactive with a carboxylic acid halide, carboxylic acid anhydride, epoxy, lactone, azlactone or isocyanato group, and which is endcapped in part with a compound, for example, of formula (12a), (12b), (12c), (12d) or (12e).

The reactions of a compound of formula (12a)–(12e) having a carboxylic acid halide group, carboxylic acid anhydride group, epoxy group, azlactone group or isocyanato group with an thiol, amino or hydroxy compound of formula (11) are well-known in the art and may be carried out as described in textbooks of organic chemistry.

For example, the reaction of the carboxylic acid halide of formula (12a) with a compound of formula (11) can be carried out under the conditions that are customary for ester, thioester, or amide formation, for example at temperatures of, for example, from −40 to 80° C., preferably from 0 to 50° C. and most preferably from 0 to 25° C., in a dipolar aprotic solvent, e.g. tetrahydrofuran, dioxane, DMSO or an aprotic solvent as mentioned below, or in a mixture of water and one of the mentioned solvents, in the presence of a base, e.g. an alkali metal hydroxide, and, where applicable, in the presence of a stabiliser. Suitable stabilisers are, for example, 2,6-dialkylphenols, hydroquinone derivatives, e.g. hydroquinone or hydroquinone monoalkyl ethers, or N-oxides, e.g. 4-hydroxy-2,2,6,6-tetramethyl-piperidin-1-yl. The reaction times may vary within wide limits, a period of, for example, from 30 minutes to 12 hours, preferably from 1 to 6 hours and especially from 2 to 3 hours, generally having been found practicable.

The reaction of a carboxylic acid anhydride or epoxide of formula (12b) or (12c) with a compound of formula (11) may be carried out as described in organic textbooks, for example in an acidic or in a basic medium.

The reaction of an azlactone of formula (12d) with a compound of formula (11) may be carried out at elevated temperature, for example at about 50 to 75° C., in a suitable organic solvent, for example an aprotic polar solvent such as DMF, DMSO, dioxane and the like, optionally in the presence of a catalyst, for example in the presence of a tertiary amine such as triethyl amine or an organotin salt such as dibutyltin dilaurate, or in particular in the presence of 1,8-diazabicyclo[5.4.0]undec-7-ene (DBU).

The reaction of a compound of formula (12e) with a compound of formula (11) can be carried out under the conditions that are customary for the formation of urethanes or ureas. In case of urethane formation it is advantageously to perform the reaction in an inert solvent. Amines of the formula (11) may be reacted with the isocyanate of formula (12e) also in an aqueous medium.

Suitable inert solvents for the reaction of a compound of formula (11) with a compound of formula (12e) are aprotic, preferably polar, solvents, for example hydrocarbons (petroleum ether, methylcyclohexane, benzene, toluene, xylene), halogenated hydrocarbons (chloroform, methylene chloride, trichloroethane, tetrachloroethane, chlorobenzene), ethers (diethyl ether, dibutyl ether, ethylene glycol dimethyl ether, diethylene glycol dimethyl ether, tetrahydrofuran, dioxane), ketones (acetone, dibutyl ketone, methyl ethyl ketone, methyl isobutyl ketone), carboxylic acid esters and lactones (ethyl acetate, butyrolactone, valerolactone), alkylated carboxylic acid amides (N,N-dimethylacetamide, N-methylpyrrolidone), nitriles (acetonitrile), sulfones and sulfoxides (dimethyl sulfoxide, tetramethylenesulfone). Polar solvents are preferably used. The reaction temperature may be, for example, from –40 to 200° C. When catalysts are used, the temperatures may advantageously be in the range of from 0 to 50° C., preferably at room temperature. Suitable catalysts are, for example, metal salts, such as ferric chloride or alkali metal salts of carboxylic acids, tertiary amines, for example $(C_1–C_6alkyl)_3N$ (tri-ethylamine, tri-n-butylamine), N-methylpyrrolidine, N-methylmorpholine, N,N-dimethylpiperidine, pyridine and 1,4-diaza-bicyclooctane. Tin salts have been found to be especially effective, especially alkyltin salts of carboxylic acids, for example dibutyltin dilaurate and tin dioctoate. The isolation and purification of the compounds prepared is carried out according to known methods, for example by means of extraction, crystallisation, recrystallisation or chromatographic purification methods.

The compounds of the formula (12a), (12b), (12c), (12d) and (12e) are known compounds which are commercially available or may be prepared according to known methods.

The compounds of formula (11) are novel and represent a further object of the invention. They may be prepared by methods known per se. For example the block copolymers of formula (1) having a linking group of formula of formula (2a) or (2b) may be prepared by reacting in any order a compound of formula

$$A—(X_1H)_n \quad (13),$$

about n molar equivalents of a compound of formula

$$X^*—R—X^* \quad (14),$$

and about molar equivalents of a compound of formula

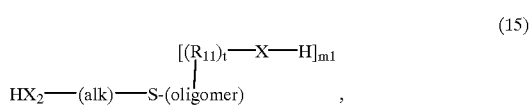

(15)

wherein X* is a group —N═C═O or carboxy or a suitable derivative thereof, for example a group —C(O)OH, —C(O)OR$_{20}$ or —C(O)—OHal wherein R$_{20}$ is, for example, C$_1$–C$_4$-alkyl, phenyl or benzyl and Hal is halogen, in particular bromine or chlorine, and A, R, R$_{11}$ X, X$_1$, X$_2$, (alk), (oligomer), n, m1 and t are each as defined above.

For example, the compound of formula (13) may be first reacted with about one molar equivalent of a compound of formula (14), and the intermediate obtained is then reacted with the compound of formula (15). Another synthetic route comprises first reacting a compound of formula (15) with a compound of formula (14), and the intermediate obtained is then reacted with a compound of formula (13). The reactions can be carried out under the conditions that are customary for ester, thioester, amide, urethane or urea formation, for example as outlined above.

The amphiphilic block copolymers of the invention wherein L is a linking group of formulae (2c) or (2d) may be prepared, for example, by reacting a compound of the formula

$$A—(X^{**})_n \quad (13a)$$

with about n molar equivalents of a compound of the above formula (15), or by reacting a compound of the above formula (13) with about n molar equivalents of a compound of formula

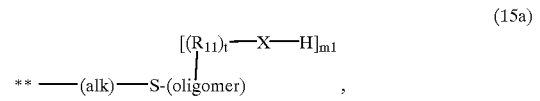

(15a)

wherein X** is carboxy or a suitable derivative thereof, for example a group —C(O)OH, —C(O)OR$_{20}$ or —C(O)—OHal, and R, R$_{11}$, R$_{20}$ X, Hal, (alk), (oligomer), n, m1 and t each have the above-mentioned meaning.

The reaction of the components of formulae (13a) and (15) or (13) and (15a), respectively, can be carried out under the conditions that are customary for ester, thioester or amide formation, for example as outlined above.

The amphiphilic block copolymers of the invention wherein L is a linking group of formulae (2e) may be prepared, for example, by reacting a compound each of the formula (13) and (15) with phosgene.

The compounds of formulae (13), (13a) and (14) are known or may be obtained according to methods known in the art. Likewise, the hydrophilic telomers of formula (15) or (15a) may be prepared according to known processes, for example, according to PCT application WO 92/09639, by copolymerizing one or more hydrophilic ethylenically unsaturated monomers in the presence of a functional chain transfer agent wherein at least one monomer of the copolymerization mixture is capable afterwards to fix a crosslinkable or polymerizable moiety Q.

The compounds of formula

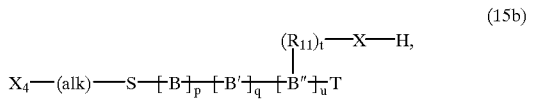

(15b)

wherein X$_4$ is —SH, —NHR$_1$, carboxy or a carboxy derivative, for example a group —C(O)OH, —C(O)OR$_{20}$ or —C(O)—OHal, wherein R$_1$, R$_{20}$ and Hal are as defined above, and is preferably —NH$_2$ or —NH(C$_1$–C$_2$-alkyl), and for (alk), B, B', B", T, p, q, t, u, R$_{11}$ and X each the above given meanings and preferences apply, are novel and represent a further object of the invention.

A process for the preparation of the preferred compounds of formula (15) or (15a) comprises copolymerizing a mixture comprising p molar equivalents of a compound of formula

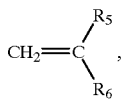 (16)

q molar equivalents of a compound of formula

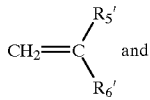 (16a)

u equivalents of a compound of formula

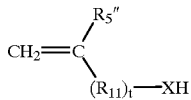 (17)

in the presence of a chain transfer agent of formula

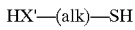 (18)
$HX'—(alk)—SH$ and optionally in the presence of an initiator for radical polymerization, wherein X' has the meaning of $—X_2H$ or $X^{**}$ above, and $R_5$, $R_5'$, $R_5''$, $R_6$, $R_6'$, $R_{11}$, X and t each have the above given meaning.

Since the compounds of formulae (16) and (17) may be identical, a particularly preferred process for the preparation of the compounds of formula (15) or (15a) comprises homo- or copolymerizing (p+u) equivalents of a monomer of formula (17) and optionally q equivalents of a monomer of formula (16a).

The radical polymerization of the monomer mixture may be induced photochemically or preferably thermally. Suitable thermal polymerization initiators are known to the skilled artisan and comprise, for example peroxides, hydroperoxides, azo-bis(alkyl- or cycloalkylnitriles), persulfates, percarbonates or mixtures thereof. Examples are benzoylperoxide, tert.-butyl peroxide, di-tert.-butyl-diperoxyphthalate, tert.-butyl hydroperoxide, azo-bis (isobutyronitrile), 1,1-azodiisobutyramidine, 1,1'-azo-bis (1-cyclohexanecarbonitrile), 2,2'-azo-bis(2,4-dimethyl-valeronitrile) and the like. Examples of suitable chain transfer agents of formula (18) are cysteamine (usually introduced as hydrochloride) or thioglycolic acid. The polymerization is carried out conveniently in an aqueous medium, preferably in an acidic medium which has a pH of from 2 to 6 and preferably 3 to 5, such as aqueous acetic acid or deluted hydrochloric acid, at elevated temperature, for example at a temperature of from 25 to 100° C. and preferably 40 to 80° C. The resulting telomer mixtures may be worked up in conventional manner using for example extraction, precipitation, ultrafiltration and the like techniques.

The hydrophilic blocks -[L-(alk)-S-(oligomer)-(Q)$_m$] of the block copolymers of the invention have an weight average molecular weight of, for example, from 200 to 20000, preferably from 250 to 12500, more preferably from 350 to 5000, and in particular from 500 to 2500.

The molecular weight of the copolymers of the formula (1) is, within wide limits, not critical. Preferably, however, the prepolymer has a weight average molecular weight of from approximately 1400 to 200000, preferably from 2000 to 100000 and more preferably from 2500 to 50000 and most preferably from 3000 to 25000.

The amphiphilic block copolymers formula (1) are prepolymers and are therefore crosslinkable, but uncrosslinked or, at least, substantially uncrosslinked; in addition, they are stable, that is to say spontaneous crosslinking as a result of homopolymerisation does not take place.

The prepolymers of formula (1) according to the invention are crosslinkable in a controlled and extremely effective manner, especially by photo-crosslinking.

The present invention further relates, therefore, to a polymer that can be obtained by photo-crosslinking of a prepolymer of formula (1), in the presence or, preferably, in the absence of an additional vinyl comonomer. These crosslinked polymers are water-insoluble.

In the photo-crosslinking, a photoinitiator capable of initiating free-radical crosslinking is suitably added. Examples thereof will be familiar to the person skilled in the art, suitable photoinitiators that may specifically be mentioned being benzoin methyl ether, 1-hydroxycyclohexylphenyl ketone, Darocure 1173 or Irgacure types. The crosslinking can then be brought about by actinic radiation, e.g. UV light, or ionising radiation, e.g. gamma rays or X-rays. The amount of photoinitiator may be selected within wide limits, an amount of up to 0.05 g/g of polymer and especially of up to 0.003 g/g of polymer having proved beneficial.

The crosslinkable copolymer of formula (1) is introduced into the crosslinking process preferably in pure form, particularly substantially free from undesired constituents, such as, for example, free from monomeric, oligomeric or polymeric starting compounds used for the preparation of the prepolymer, and/or free from secondary products formed during the preparation of the prepolymer. Said prepolymers in pure form are obtained advantageously by previously purifying them in a manner known per se, for example by precipitation with a suitable solvent, filtration and washing, extraction in a suitable solvent, dialysis, reverse osmoses (RO) or ultrafiltration, reverse osmoses and ultrafiltration being especially preferred.

The preferred purification processes for the prepolymers of the invention, reverse osmoses and ultrafiltration, can be carried out in a manner known per se. It is possible for the ultrafiltration and reverse osmoses to be carried out repeatedly, for example from two to ten times. Alternatively, the ultrafiltration and reverse osmoses can be carried out continuously until the selected degree of purity is attained. The selected degree of purity can in principle be as high as desired.

The copolymers of formula (1) may be crosslinked, for example, in form of a solution or a mesophase.

One embodiment of the invention relates to the photopolymerisation of the block copolymers of the invention in solution, preferably in one or more different organic solvents. Suitable solvents are in principle all solvents that dissolve the polymers according to the invention and an optional vinyl comonomer which may be additionally used, e.g. alcohols, such as $C_1$–$C_6$-alkanols, e.g. n- or iso-propanol, ethanol or methanol, glycols such as ethylene glycol, diethylene glycol, propylene glycol, butylene glycol, carboxylic acid amides, such as dimethylformamide, or dimethyl sulfoxide, and mixtures of suitable solvents, e.g. mixtures of water with an alcohol, e.g. a water/propanol, water/ethanol or a water/methanol mixture, or mixtures of water with a glycol.

According to this embodiment of the invention, the photo-crosslinking is preferably effected from a solution comprising (i) one or more prepolymers according to the invention which can be obtained as a result of the preferred purification step, ultrafiltration, (ii) one or more solvents selected from the group consisting of a $C_1$–$C_6$-alkanol, a glycol, a carboxylic acid amide, dimethyl sulfoxide and water, and optionally (iii) an additional vinyl comonomer. For example, photo-crosslinking of the prepolymers is carried out in ethanol or n- or iso-propanol.

The vinyl comonomer that can additionally be used according to the invention in the photo-crosslinking may be hydrophilic or hydrophobic or may be a mixture of a hydrophobic and a hydrophilic vinyl monomer. Suitable vinyl monomers include especially those which are customarily used in the manufacture of contact lenses. The expression "hydrophilic vinyl monomer" is understood to mean a monomer that typically produces as homopolymer a polymer that is water-soluble or capable of absorbing at least 10% by weight water. Analogously, the expression "hydrophobic vinyl monomer" is understood to mean a monomer that typically produces as homopolymer a polymer that is water-insoluble or capable of absorbing less than 10% by weight water.

The proportion of vinyl comonomers, if used, is preferably from 0.5 to 80 units per prepolymer of formula (1), especially from 1 to 30 units of vinyl comonomer per prepolymer unit of formula (1) and most preferably from 5 to 20 units per prepolymer of formula (1).

It is also preferred to use a hydrophobic vinyl comonomer or a mixture of a hydrophobic vinyl comonomer with a hydrophilic vinyl comonomer, the mixture containing at least 50% by weight of a hydrophobic vinyl comonomer. In that manner, the mechanical properties of the polymer can be improved without the water content being appreciably reduced. In principle, however, both conventional hydrophobic vinyl comonomers and conventional hydrophilic vinyl comonomers are suitable for copolymerisation with a prepolymer of formula (1).

Suitable hydrophobic vinyl comonomers include, without the following being an exhaustive list, $C_1$–$C_{18}$alkyl acrylates and methacrylates, $C_3$–$C_{18}$alkylacrylamides and -methacrylamides, acrylonitrile, methacrylonitrile, vinyl-$C_1$–$C_{18}$alkanoates, $C_2$–$C_{18}$alkenes, $C_2$–$C_{18}$haloalkenes, styrene, $C_1$–$C_6$alkylstyrene, vinyl alkyl ethers in which the alkyl moiety has from 1 to 6 carbon atoms, $C_2$–$C_{10}$perfluoroalkyl acrylates and methacrylates or correspondingly partially fluorinated acrylates and methacrylates, $C_3$–$C_{12}$perfluoroalkyl-ethyl-thiocarbonylaminoethyl acrylates and methacrylates, acryloxy- and methacryloxy-alkylsiloxanes, N-vinylcarbazole, $C_1$–$C_{12}$alkyl esters of maleic acid, fumaric acid, itaconic acid, mesaconic acid and the like. Preferred are, for example, $C_1$–$C_4$alkyl esters of vinylically unsaturated carboxylic acids having from 3 to 5 carbon atoms or vinyl esters of carboxylic acids having up to 5 carbon atoms.

Examples of suitable hydrophobic vinyl comonomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthio-carbonylaminoethyl methacrylate, isobornyl methacrylate, trifluoroethyl methacrylate, hexafluoroisopropyl methacrylate, hexafluorobutyl methacrylate, tris-trimethylsilyloxy-silyl-propyl methacrylate, 3-methacryloxypropylpentamethyidisiloxane and bis(methacryloxypropyl)-tetramethyldisiloxane.

Suitable hydrophilic vinyl comonomers include, without the following being an exhaustive list, hydroxy-substituted lower alkyl acrylates and methacrylates, acrylamide, methacrylamide, lower alkylacrylamide and -methacrylamide, ethoxylated acrylates and methacrylates, hydroxy-substituted lower alkylacrylamides and methacrylamides, hydroxy-substituted lower alkyl vinyl ethers, sodium ethylenesulfonate, sodium styrenesulfonate, 2-acrylamido-2-methylpropanesulfonic acid, N-vinylpyrrole, N-vinylsuccinimide, N-vinylpyrrolidone, 2- or 4-vinylpyridine, acrylic acid, methacrylic acid, amino- (the term "amino" also including quaternary ammonium), mono-lower alkylamino- or di-lower alkylamino-lower alkyl acrylates and methacrylates, allyl alcohol and the like. Preferred are, for example, hydroxy-substituted $C_2$–$C_4$alkyl (meth)acrylates, five- to seven-membered N-vinyl lactams, N,N-di-$C_3$–$C_4$alkyl(meth)acrylamides and vinylically unsaturated carboxylic acids having a total of from 3 to 5 carbon atoms.

Examples of suitable hydrophilic vinyl comonomers include hydroxyethyl methacrylate, hydroxyethyl acrylate, acrylamide, methacrylamide, dimethylacrylamide, allyl alcohol, vinylpyridine, vinylpyrrolidine, glycerol methacrylate, N-(1,1-dimethyl-3-oxobutyl)-acrylamide and the like.

Preferred hydrophobic vinyl comonomers are methyl methacrylate and vinyl acetate. Preferred hydrophilic vinyl comonomers are 2-hydroxyethyl methacylate, N-vinylpyrrolidone and acrylamide. Most preferably, the crosslinking of the copolymers of formula (1) is carried out in the absence of a vinylic comonomer.

According to another embodiment of the invention, the copolymers of formula (1) are previously converted into an aqueous mesophase which is at least partly bicontinuous, and the aqueous mesophase is then subjected to photo-crosslinking. A suitable process for producing an aqueous mesophase composition and its crosslinking in an ophthalmic mould is disclosed in PCT application WO 99/12059, which application is herein incorporated by reference. A mesophase of a block copolymer of the invention may be prepared, for example, by simply admixing suitable amounts of (i) a prepolymer of formula (1), (ii) an aqueous solution which may comprise, in addition to water, for example a water-miscible solvent and/or salts, and (iii) optionally further components such as a photoinitiator, a surfactant a hydrophobic or hydrophilic comonomer as mentioned before, or a pharmaceutical effective agent, for example a protein, enzyme, vitamin, disinfectant, bactericide or the like, in any order at a temperature of, for example, 0 to 100° C., preferably 10 to 50° C., and more preferably 15 to 40° C. The mesophases may form spontaneously or upon stirring and/or standing for a suitable period. For example, the components that make up the mesophase are mixed for about 1 minute to 1 week, preferably for 30 minutes to 5 days and most preferably 2 hours to 3 days, in order to form a mesophase which is ready for being further processed according to the invention.

Mesophases of a block copolymer of the invention comprise, for example, from 10 to 100 percent by weight of block copolymer(s) of formula (1), from about 0 to about 90 percent by weight of aqueous solution and from 0 to 40 percent by weight of further components. Preferably, the bicontinuous mesophases of a block copolymer of the invention comprise from about 30 to about 85 percent by weight of prepolymer(s) of formula (1), from about 15 to about 70 percent by weight of aqueous solution and from 0 to 10 percent by weight of further components. Particularly preferred mesophases comprise from 30 to 75 percent by weight of prepolymer(s) of formula (1) and from 25 to 70 percent by weight of aqueous solution.

The solutions or mesophases comprising a block copolymer of formula (1) may be processed in a manner known per se to form mouldings, especially contact lenses, for example by carrying out the photo-crosslinking of the prepolymers of the invention in a suitable mould, in particular a contact lens mould. For example, the solution or mesophase is introduced into an opthalmic mould in a manner known per se, such as, especially, by conventional metering in, for example by dropwise introduction or by extrusion. Suitable moulds are generally customary contact lens moulds as known in the state of the art. Thus, the contact lenses according to the invention can be manufactured, for example, in a manner known per se, for example in a conventional "spin-casting mould", as described, for example, in U.S. Pat. No. 3,408,429, or by the so-called Full-Mould process in a static mould, as described, for example, in U.S. Pat. No. 4,347,198. Appropriate moulds are made, for examples from polypropylene. Quartz, sapphire glass and metals, for example, are to suitable materials for re-usable moulds.

The crosslinking can be triggered in the mould, for example by actinic radiation, such as, for example, UV light, or by ionising radiation, such as, for example, gamma radiation, electron radiation or X radiation. The crosslinking can where appropriate also be triggered thermally or electrochemically. Attention is drawn to the fact that the photocrosslinking can be carried out in a very short time, for example in $\leq 30$ minutes, preferably $\leq 20$ minutes, more preferably $\leq 5$ minutes, even more preferably in $\leq 1$ minute, especially in 10 to 60 seconds, especially preferably, as disclosed in the examples.

The opening of the mould such that the moulding can be removed from the mould can be carried out in a manner known per se.

The mouldings obtainable from the block copolymers of formula (1) are preferably at least partly bicontinuous, that is to say the mouldings have at least two partly bicontinuous phases, for example an oxygen-permeable and an ion-permeable phase, which are intermingled.

The invention further relates, therefore, to mouldings that comprise or, preferably, substantially consist of a crosslinked block copolymer of formula (1). Further examples of mouldings of the invention, apart from contact lenses, are biomedical or special ophthalmic mouldings, e.g. intraocular lenses, artificial cornea, eye dressings, mouldings for use in surgery, such as heart valves, artificial arteries or the like, and films or membranes, e.g. membranes for controlling diffusion, photo-structurable films for information storage, or photoresist materials, e.g. membranes or mouldings for etch resists or screen print resists.

If the moulding manufactured according to the invention is a contact lens and the latter has been manufactured from a previously purified prepolymer using an organic solvent such as an alcohol or an aqueous solution comprising an alcohol or the like, then it is normally unnecessary for the removal of the moulding to be followed by purification steps, e.g. extraction, because the prepolymers used do not contain any undesired low-molecular-weight constituents; consequently, the crosslinked product also is free or substantially free of such constituents and subsequent extraction can be dispensed with. The contact lens can accordingly be converted into a ready-for-use contact lens directly in conventional manner by hydration. Suitable forms of hydration capable of producing ready-for-use contact lenses with a wide variety of water contents are known to the person skilled in the art. The contact lens is swelled, for example, in water, in an aqueous salt solution, especially in an aqueous salt solution having an osmolarity of approximately from 200 to 450 milliosmol in 1000 ml (unit: mosm/l), preferably approximately from 250 to 350 mosm/l and especially approximately 300 mosm/l, or in a mixture of water or an aqueous salt solution with a physiologically tolerable polar organic solvent, for example glycerol. Swelling of the prepolymer in water or in aqueous salt solutions is preferred.

The aqueous salt solutions used for the hydration are advantageously solutions of physiologically tolerable salts, such as buffer salts customary in the field of contact lens care, e.g. phosphate salts, or isotonising agents customary in the field of contact lens care, such as, especially, alkali metal halides, e.g. sodium chloride, or solutions of mixtures thereof. An example of an especially suitable salt solution is a synthetic, preferably buffered, lachrymal fluid that has been matched to natural lachrymal fluid with regard to pH value and osmolarity, e.g. an unbuffered or preferably buffered, for example phosphate buffer-buffered, sodium chloride solution the osmolarity and pH value of which correspond to the osmolarity and pH value of human lachrymal fluid.

The hydration fluids defined above are preferably pure, that is to say free or substantially free of undesired constituents. Most preferably, the hydration fluid is pure water or a synthetic lachrymal fluid as described above.

If the moulding manufactured according to the invention is a contact lens and the latter has been manufactured from an aqueous mesophase of a previously purified prepolymer of the invention, the crosslinked product also will not contain any troublesome impurities. There is normally no need, therefore, for subsequent extraction. Since the crosslinking is carried out in an aqueous medium, there is also no need for subsequent hydration. In accordance with an advantageous embodiment, therefore, the contact lenses obtainable by this process are distinguished by the fact that they are suitable for use as intended without extraction or hydration. The expression "use as intended" is understood in this context to mean especially that the contact lenses can be inserted into the human eye.

The copolymers of the invention are especially suitable for the manufacture of mass-produced articles, such as, for example, contact lenses that are worn for a short time, for example for a month, a week or just one day, and are then replaced by new lenses. This is in particular because contact lenses prepared from a mesophase of the copolymers can be used for their intended use without subsequent treatment steps, such as extraction or hydration.

In addition, the contact lenses obtainable according to the invention have a range of unusual and extremely advantageous properties and are therefore suited to extended periods of wear (true extended wear, i.e., seven days or more). Among these properties are, for example, their excellent compatibility with the human cornea and with tear fluid, if necessary after suitable surface treatment (e.g. coating), which is based on a balanced ratio between water content, oxygen permeability, ion permeability and mechanical and absorptive properties. This results in high comfort and the absence of irritation and allergenic effects. Owing to their favourable permeability properties with respect to gases ($CO_2$ and $O_2$), various salts, nutrients, water and diverse other components of tear fluid, the contact lenses prepared according to the process of the invention have no effect, or virtually no effect, on the natural metabolic processes in the cornea. Furthermore, the contact lenses obtainable according to the process are optical clear and transparent, have a high shelf life and good mechanical properties, for example concerning the modulus of elasticity, elongation at break or dimensional stability.

All of the advantages mentioned above apply, of course, not only to contact lenses but also to other mouldings of the invention. The sum of the various advantageous aspects in the manufacture of the mouldings of the invention results in the mouldings of the invention being especially suitable as mass-produced articles, such as, for example, contact lenses that are worn for a short period and then replaced by new lenses.

In the Examples which follow, amounts are by weight, unless specified otherwise, and temperatures are given in degrees Celsius.

Preparation of Telomers of Formula (15)

EXAMPLE 1

Telomer from Mono-2-isocyanatoethyl Methacrylato Trehalose

A 100 ml three-necked round bottom flask is charged with a solution of 3.8 g (33.4 mmol) cysteamine hydrochloride in 45 ml of 0.1 molar aqueous acetic acid. 55 mg (0.2 mmol) $\alpha,\alpha'$-azodiisobutyramidine dihydrochloride and 53 g (106 mmol) of the monoadduct of IEM to $\alpha,\alpha'$-trehalose are added. An intensive cooler and an internal thermometer are connected to the flask. The apparatus is evacuated to 100 mbar and filled with argon. This is repeated five times. The mixture is heated overnight to 60° C. and then cooled to room temperature. The product is precipitated in 2 liters of acetone and isolated by filtration, yielding 53.6 g of a slightly yellow colored powder. No resonances corresponding to C=C double bonds can be detected by $^1$H-NMR spectroscopy, indicating >98% conversion of the monomer. 17.3 g of the product are dissolved in 200 ml water and the pH is adjusted to 10.5 by addition of 107 ml 0.1 molar sodium hydroxide solution and then diluted with water to a total volume of 500 ml. Salts and residual low molecular weight components are removed by ultrafiltration using a UFP-1-E-4A cartridge from A/G Technology Corporation, Needham, MA, yielding 14.3 g product as retentate and 2.5 g permeate of lower molecular weight. The concentration of amino-groups is determined by functional group titration, result 0.12 mmol/g $NH_2$ corresponding to an average molecular weight of the telomer of 8300 g/mol and a degree of polymerization of 16.

EXAMPLE 2

Telomer from 2-hydroxy-3-methacryloxypropyl trimethylammonium chloride

A 100 mL three-necked round bottom flask is charged with a solution of 0.92 9 (10 mmol) 2 thioglycolic acid in 50 mL deionized water. 27 mg (0.1 mmol) $\alpha,\alpha'$-azodiisobutyramidine dihydrochloride and 11.9 g (50 mmol) of 2-Hydroxy-3-methacryloxypropyl trimethylammonium chloride are added. The pH of the solution is adjusted to pH 3 by addition of 4 molar hydrochloric acid. An intensive cooler is connected to the flask. The apparatus is evacuated to 100 mbar and filled with argon. This is repeated five times. The mixture is heated to 60° C. for three hours and then cooled to room temperature. An analytical sample is freeze-dried and the monomer conversion is determined by $^1$H-NMR spectroscopy. No resonances corresponding to C=C double bonds can be detected, indicating >98% conversion of the monomer. The product is isolated by precipitation of the aqueous solution into 2000 mL acetone. The precipitate is filtered off and vacuum dried. Yield 10.2 g white, very hygroscopic solid. The concentration of carboxylic acid-groups is determined by functional group titration, result 0.41 mmol/g COOH corresponding to an average molecular weight of the telomer of 2440 g/mol.

EXAMPLE 3

Oligoethyleneoxide Methacrylate Telomer

A 250 mL three-necked round bottom flask is charged with a solution of 34 mg (0.125 mmol) $\alpha,\alpha'$-azodiisobutyramidine dihydrochloride dissolved in 50 mL methanol. 20 g (45.6 mmol) mono-amino terminated polyethylene oxide (Blemer® PE 350 from NOF Corporation $M_w$=about 400) and 1.8 g (15.2 mmol) 2-(BOC-amino) ethane thiol are added. An intensive cooler is connected to the flask. The apparatus is evacuated to 100 mbar and filled with argon. This is repeated five times. The mixture is heated overnight to 60° C. and then cooled to room temperature. An analytical sample is removed and the solvent evaporated. The monomer conversion is determined by $^1$H-NMR spectroscopy. No resonances corresponding to C=C double bonds can be detected, indicating >98% conversion of the monomer. The product is isolated by evaporation of the solvent. Yield 21 g of a clear, colorless and viscous liquid. The concentration of BOC-protective groups is determined by titration as 0.34 mmol/g, corresponding to an average molecular weight of the telomer of 2900 g/mol. The BOC-protective groups are removed by a treatment of the product in an acidic medium.

EXAMPLE 4

N-acryloyl Morpholine/2-hydroxyethyl Acrylamide co-telomer

A 1000 mL three-necked round bottom flask is charged with a solution of 28.4 9 (250 mmol) cysteamine hydrochloride in 400 mL deionized water. 407 mg (1.5 mmol) $\alpha,\alpha'$-azodiiso-butyramidine dihydrochloride and 70.6 g (500 mmol) acryloyl morpholine and 28.8 g (250 mmol) N-hydroxyethyl acrylamide are added. An intensive cooler and an internal thermometer are connected to the flask. The apparatus is evacuated to 100 mbar and filled with argon. This is repeated five times. The mixture is heated to 60° C. for four hours and then cooled to room temperature. An analytical sample is freeze-dried and the monomer conversion is determined by $^1$H-NMR spectroscopy. No resonances corresponding to C=C double bonds can be detected, indicating >98% conversion of the monomer. The remaining mixture is adjusted to pH=10 by addition of 30% KOH solution. Salts and low molecular weight residues such as unreacted chain transfer agent are removed by reverse osmosis using a Millipore Proscale system equipped with a Millipore Helicon RO-4 Nanomax 50 membrane operating at a pressure of 15 bar. The product is isolated from the obtained retentate by freeze-drying. Yield: 85 g of a white powder. The concentration of amino-groups is determined by functional group titration, result 0.95 mmol/g $NH_2$ corresponding to an average molecular weight of the co-telomer of 1050 g/mol. GPC-analysis indicates a monomodal molecular weight distribution and the absence of high molecular weight polymer.

EXAMPLE 5

N-methyl-N-hydroxyethyl Acrylamide1 N,N-dimethyl Acrylamide Cotelomer

A 1000 mL three-necked round bottom flask is charged with a solution of 27.26 9 (240 mmol) cysteamine hydrochloride in 400 mL deionized water. 390 mg (1.2 mmol) 2,2'-azobis-[2-(2-imidazolin-2-yl)propane]dihydrochloride, 42,35 g (427 mmol) freshly distilled N,N-dimethyl acrylamide, and 38,74 g (300 mmol) distilled N-methyl-N-hydroxyethyl acrylamide are added. An intensive cooler and an internal thermometer are connected to the flask. The apparatus is evacuated to 100 mbar and filled with argon. This is repeated five times. The mixture is heated overnight to 40° C. and then cooled to room temperature. An analytical sample was freeze-dried and the monomer conversion was determined by $^1$H-NMR spectroscopy. No resonances corresponding to C=C double bonds could be detected, indicating >98% conversion of the monomer.

The remaining mixture is diluted with distilled water to 1000 mL total volume. Salts and low molecular weight residues such as unreacted chain transfer agent are removed by reverse osmosis using a Millipore Proscale system equipped with a Millipore Helicon RO-4 Nanomax 50 membrane operating at a pressure of 10 bar. The product is isolated from the obtained retentate by freeze-drying. Yield: 79,1 g of a white powder. The concentration of amino-groups determined by functional group titration indicates an average molecular weight of the co-telomer of 800 g/mol. GPC-analysis indicates a monomodal molecular weight distribution and the absence of high molecular weight polymer.

EXAMPLES 6–11

Further telomers and co-telomers are obtained by the method as outlined in Example 5 using the monomers and chain transfer agents in a molar ratio as mentioned in the table below.

TABLE

| Example | Monomer 1 | Monomer 2 | Chain transfer agent | Molar ratio | Weight average molecular weight |
|---|---|---|---|---|---|
| 6 | NHAA | — | CysHCl | 5/—/1 | 1120 g/mol |
| 7 | NAM | NHAA | CysHCl | 3/2/1 | 1280 g/mol |
| 8 | NAM | NMNHAA | CysHCl | 2/1/1 | 1050 g/mol |
| 9 | NMNHAA | — | CysHCl | 5/—/1 | 1000 g/mol |
| 10 | NAM | NMNHAA | CysHCl | 5/5/2 | 800 g/mol |
| 11 | NAM | NMNHAA | CysHCl | 1/4/1 | 780 g/mol |

CysHCl=Cysteamine hydrochloride; DMAA=dimethyl acrylamide; NAM=N-acryloyl morpholine; NHAA=N-hydroxyethyl acrylamide; NMNHAA=N-methyl-N-hydroxyethyl acrylamide;

EXAMPLE 12

Synthesis of a Polydimethylsiloxane with Terminal Isocyanate Functions

Under an inert atmosphere, a 750 mL five-necked glass reactor equipped with a glass anchor stirrer, interior thermometer, intensive cooler and a dropping funnel is charged with 8.03 g (36 mmol) distilled isophorone diisocyanate, 80 mg dibutyl tin dilaurate, and 100 mL dry THF. The homogeneous solution is cooled to −10° C. Hydroxyalkyl-terminated polydimethylsiloxane (Shin-Etsu KF-6003, OH-titration: 0.36 mEq/g) is degassed and dried under vacuum (0.01 mbar) at 70° C. 30 minutes. After cooling to room temperature, 100 g (36 mmol OH-groups) KF-6003 is filled into the dropping funnel and added dropwise to the diisocyanate solution during 90 minutes, maintaining the solution temperature at −10° C. The solution is stirred at 0° C. for another 90 minutes. The solvent is removed on a rotary evaporator at 35° C. Residual solvent is removed under high vacuum (0.002 mbar). Yield: 107 g of a clear, colorless and viscous liquid. NCO-titration: 0.31 mEq/g (theory 0.33 mEq/g). Hydroxyl-content below detection limit.

EXAMPLE 13

Synthesis of a Block Copolymer of Formula (11)

Under inert atmosphere, a 350 mL five-necked glass reactor equipped with a glass anchor stirrer, interior thermometer, intensive cooler and a dropping funnel is charged with 6.2 g (7.75 mmol ammonium chloride groups) co-telomer of Example 5,870 mg triethylamine, and 15 mL chloroform. After stirring for a few minutes a clear solution is obtained. Two drops (ca. 50 mg) dibutyl tin dilaurate are added. 25 g (7.75 mmol NCO-groups) bis-IPDI-functional polydimethylsiloxane of Example 12 are dissolved in 25 mL chloroform, filled into the dropping funnel, and added dropwise to the telomer solution within one hour while stirring at room temperature. Stirring is continued overnight at room temperature. Infrared spectroscopy shows absence of any NCO-absorption at 2270 cm$^{-1}$. The polymer is precipitated dropwise into 3.5 liters of water under rapid stirring to remove triethylamine and salts. After sedimentation of the precipitated material, the liquid is decanted and the polymer collected and dried under high vacuum (0.01 mbar). Yield: 25.9 g white powder. Endgroup titration analysis confirms the absence of amine and isocyanate groups. Hydroxyl-group content 0.63 mEq/g.

EXAMPLE 14

Synthesis of a Crosslinkable Amphiphilic Block Copolymer of Formula (1)

A 100 mL three-necked round bottom flask equipped with a magnetic stir bar, internal thermometer, intensive cooler and drying tube, is charged with 7 g amphiphilic triblock copolymer of Example 13 and 10 mL chloroform. After stirring overnight a clear solution is formed. 460 mg (2.94 mmol) distilled isocyanatoethyl methacrylate (IEM), 18 mg dibutyl tin dilaurate and 14 mg triphenyl bismut are added. The solution is stirred overnight at room to temperature. Infrared spectroscopy spectroscopy shows absence of any NCO-absorption at 2270 cm$^{-1}$. The solvent is carefully removed on a rotary evaporator and the obtained material dried under high vacuum (0.01 mbar). Yield: 7.3 g of a clear film-forming polymer.

EXAMPLE 15

Casting and Curing of Contact Lenses from a Prepolymer of Formula (1)

A centrifugation tube is charged with 4.15 g of product from Example 14 and 1.04 g n-propanol containing 1.2 weight percent of photoinitiator Darocur 2959. The components are thoroughly mixed until a homogeneous viscous solution is formed. The formulation is centrifuged at 5000 rpm for 10 minutes to remove air bubbles. Portions of the formulation are filled into contact lens molds (PP-molds or quartz glass molds) and cured by UV-irradiation for 30 seconds with a UV intensity of 1.9 mW/cm² (Macam-lamp). After mold opening perfectly clear and colorless contact lenses are obtained.

Lenses with an average center thickness of 110 mm show an apparent oxygen permeability of 200 barrers (coulometric method). Mechanical testing shows an E-modulus of 1.6 MPa and elongation at break above 100%.

What is claimed is:

1. A crosslinkable amphiphilic block copolymer of formula

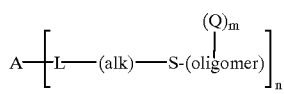
(1)

wherein A is a hydrophobic segment selected from the group consisting of a polysiloxane, a perfluoroalkyl polyether and mixtures thereof, L is a bivalent linking group of formula

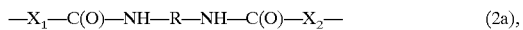 (2a),

 (2b),

 (2c),

 (2d) or

 (2e), wherein $X_1$ and $X_2$, independently of one another, are —O—, —S— or —NR$_1$—, R$_1$ is hydrogen or $C_1$–$C_4$-alkyl, R is linear or branched $C_1$–$C_{18}$-alkylene or unsubstituted or $C_1$–$C_4$-alkyl— or $C_1$–$C_4$-alkoxy-substituted $C_6$–$C_{10}$-arylene, $C_7$–$C_{18}$-aralkylene, $C_6$–$C_{10}$-arylene-$C_1$–$C_2$-alkylene-$C_6$–$C_{10}$-arylene, $C_3$–$C_8$-cycloalkylene, $C_3$–$C_8$-cycloalkylene-$C_1$–$C_6$-alkylene, $C_3$–$C_8$-cycloalkylene-$C_1$–$C_2$-alkylene-$C_3$–$C_8$-cycloalkylene or $C_1$–$C_6$-alkylene-$C_3$–$C_8$-cycloalkylene-$C_1$–$C_6$-alkylene; (alk) is $C_2$–$C_{12}$-alkylene;

(oligomer) is the radical of a hydrophilic telomer which is derived from one or more different copolymerizable vinyl monomers;

Q is an organic radical comprising at least one crosslinkable or polymerizable group;

m is an integer from 1 to 6, and n is an integer >1.

2. An amphiphilic block copolymer according to claim 1, wherein segment A comprises a polysiloxane block having terminal alkylene groups of formula

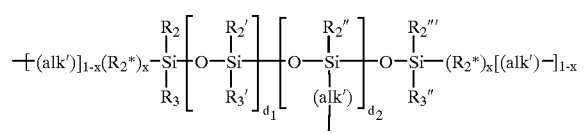
(3)

in which (alk') is alkylene having up to 20 carbon atoms which may be interrupted by —O—; 80–100% of the radicals $R_2$, $R_2'$, $R_2'''$, $R_2^*$, $R_3$, $R_3'$ and $R_3''$, independently of one another $C_1$–$C_8$-alkyl and 0–20% of the radicals $R_2$, $R_2'$, $R_2''$, $R_2'''$, $R_2^*$, $R_3$, $R_3'$ and $R_3''$, independently of one another, are $C_3$–$C_{12}$-alkenyl, unsubstituted or $C_1$–$C_4$ alkyl- or $C_1$–$C_4$-alkoxy-substituted phenyl, fluoro($C_1$–$C_{18}$-alkyl) or cyano($C_1$–$C_{12}$-alkyl), x is 0 or 1, $d_1$ is an integer of from 5 to 700, $d_2$ is (n–2) if x is 0, and is n if x is 1 wherein n is as defined above, and the sum of ($d_1$+$d_2$) is from 5 to 700.

3. An amphiphilic block copolymer according to claim 1, wherein L is a linking group of formula (2a), wherein R is linear or branched $C_6$–$C_{10}$alkylene; or cyclohexylene-methylene or cyclohexylene-methylene-cyclohexylene each unsubstituted or substituted in the cyclohexylene moiety by from 1 to 3 methyl groups.

4. An amphiphilic block copolymer according to claim 1, wherein the telomer radical —(oligomer)—(Q)$_m$ corresponds to formula

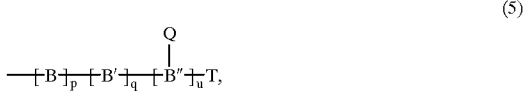
(5)

wherein B and B', independently of one another, are 1,2-ethylene radical derivable from the polymerization residue of a copolymerizable vinyl monomer that is substituted by a hydrophilic substituent, B" is a 1,2-ethylene radical derivable from the polymerization residue of a copolymerizable vinyl monomer, Q is an organic radical comprising at least one crosslinkable or polymerizable group;

p and q are each independently of another an integer from 0 to 150, wherein the total of (p+q) is an integer from 2 to 150, u is an integer from 1 to 4, and T is a monovalent group that is suitable to act as a polymerization chain-reaction terminator.

5. An amphiphilic block copolymer according to claim 4, wherein B and B', independently of one another, are a radical of formula

(6a)

wherein $R_5$ is hydrogen or $C_1$–$C_4$-alkyl, and $R_6$ is a nonionic substituent selected from the group consisting of $C_1$–$C_2$-alkyl, which is substituted by —OH or —NR$_4$R$_4'$, wherein $R_4$ and $R_4'$, independently of one another, are hydrogen or $C_1$–$C_2$-alkyl; a radical —COOY wherein Y is $C_1$–$C_3$-alkyl; $C_2$–$C_4$-alkyl which is substituted by —OH, —NR$_4$R$_4'$ wherein $R_4$ and $R_4'$, independently of one another are hydrogen or $C_1$–$C_2$-alkyl, or Y is a radical —CH$_2$CH$_2$—O—(CH$_2$CH$_2$O)$_{2-8}$—H or —C$_2$–C$_4$-alkylene-NH—C(O)—O—G wherein —O—G is the radical of a saccharide; a radical —C(O)—NY$_1$Y$_2$, wherein Y$_1$ and Y$_2$, independently of one another, are hydrogen or $C_1$–$C_6$-alkyl which is unsubstituted or substituted by hydroxy, or Y$_1$ and Y$_2$ together with the adjacent N-atom form a heterocyclic 6-membered ring having no further heteroatom or having one further N- or O-atom; a radical —OY$_3$, wherein Y$_3$ is hydrogen, $C_1$–$C_4$-alkyl which is unsubstituted or substituted by —NH$_2$ or —N($C_1$–$C_2$-alkyl, or is a group —C(O)$C_1$–$C_2$-alkyl; and a 5- or 6-membered heteroaromatic or heteroaliphatic radical having one N-atom and in addition no further heteroatom or an additional N-, O- or S-heteroatom, or a 5 to 7-membered lactame.

6. An amphiphilic block copolymer according to claim 5, wherein $R_6$ is selected from the group consisting of a radical —COOY, wherein Y is $C_1$–$C_2$-alkyl, $C_2$–$C_3$-alkyl, which is substituted by hydroxy, amino or N,N-di-$C_1$–$C_2$-alkylamino; a radical —$CH_2CH_2$—O—($CH_2CH_2O$)$_{2-8}$—H; a radical —$C_2$–$C_4$-alkylene-NH—C(O)—O—G wherein —O—G is the radical of trehalose or a cyclodextrin fragment with a maximum of 8 sugar units; a radical —CO—$NY_1Y_2$, wherein $Y_1$ and $Y_2$, independently of one another, are hydrogen or $C_1$–$C_4$-alkyl which is unsubstituted or substituted by hydroxy, or $Y_1$ and $Y_2$ together with the adjacent N-atom form a N-$C_1$–$C_2$-alkylpiperazino or morpholino ring; and a heterocyclic radical selected from the group consisting of N-pyrrolidonyl, 2- or 4-pyridinyl, 2-methylpyridin-5-yl, 2-, 3- or 4-hydroxypyridinyl, N-ε-caprolactamyl, N-imidazolyl, 2-methylimidazol-1-yl, N-morpholinyl and 4-N-methylpiperazin-1-yl.

7. An amphiphilic block copolymer according to claim 1, wherein Q is a radical of the formula $$—(R_{11})_t—X—Q_1 \qquad (7),$$

wherein $R_{11}$ is $C_1$–$C_8$-alkylene; or is a radical of formula $$—C(O)—X_3\text{-Alk-,} \qquad (8a),$$

$$—C(O)—O\text{-Alk'-NH}—C(O)—O—(CH_2CH_2O)_g—CH_2CH_2—(8b), \text{ or}$$

$$—C(O)—O\text{-Alk'-NH}—C(O)—O—G_1— \qquad (8c),$$

Alk is $C_2$–$C_{12}$-alkylene which is unsubstituted or substituted by hydroxy or a radical —N($R_{12}$)$_3^+$An— wherein $R_{12}$ is hydrogen or $C_1$–$C_4$-alkyl and An$^-$ is an anion, Alk' is $C_2$–$C_{12}$-alkylene, $X_3$ is —O— or —NR$_{13}$—, $R_{13}$ is hydrogen or $C_1$–$C_4$-alkyl, t is an integer of 0 or 1, g is an integer from 1 to 23, $G_1$ is the radical of a saccharide reduced by one hydroxy group;

X is a group —O—, —S—, —NR$_{13}$'— or —N(R$_{13}$')$_2^+$ $_{An^-}$ wherein $R_{13}$' is hydrogen or $C_1$–$C_4$-alkyl and An$^-$ is an anion, $Q_1$ is a radical $R_{14}$ or is a radical of formula

 (9a)

 (9b)

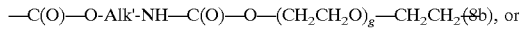 (9c)

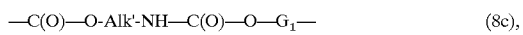

(Alk") is linear or branched $C_3$–$C_6$-alkylene, (Alk*) is linear or branched $C_1$–$C_6$-alkylene, (Alk**) is linear or branched $C_2$–$C_{12}$-alkylene, and $R_{14}$ is a radical of formula

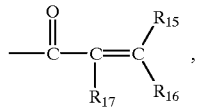 (10)

wherein $R_{17}$ is hydrogen, $C_1$–$C_4$-alkyl or halogen, and each of $R_{15}$ and $R_{16}$ independently of the other is hydrogen, $C_1$–$C_4$-alkyl, phenyl, carboxy or halogen.

8. An amphiphilic block copolymer according to claim 7 wherein t is 1, X is —O— or —NH—, and $R_{11}$ is methylene; or is a radical of formula (8a), wherein (Alk) is $C_2$–$C_4$-alkylene, and $X_3$ is —O—, —NH— or —N($C_1$–$C_2$-alkyl)—; or is a radical of formula (8b) wherein (Alk') is $C_2$–$C_4$-alkylene, and g is an integer of from 1 to 3; or is a radical of formula (8c) wherein (Alk') is $C_2$–$C_4$-alkylene, and —$OG_1$ is the radical of trehalose or a cyclodextrin fragment with a maximum of 8 sugar units, each reduced by one hydroxy group.

9. An amphiphilic block copolymer according to claim 7, wherein $Q_1$ is a radical $R_{14}$ of formula (10) or a radical of formulae (9a), (9b) or (9c), wherein -[(Alk")-OH]— is 2-hydroxy-1,3-propylene, (Alk*) is $C_1$–$C_3$-alkylene, (Alk**) is $C_2$–$C_4$-alkylene, $R_{15}$ and $R_{16}$ are each hydrogen, and $R_{17}$ is hydrogen or methyl.

10. An amphiphilic block copolymer according to claim 1 of formula

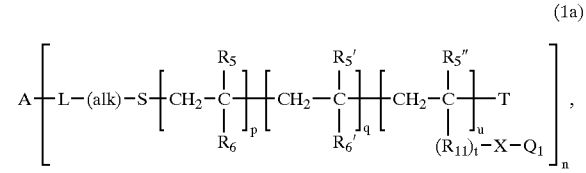 (1a)

wherein A is a hydrophobic polysiloxane segment,

L is a linking group of formula (2a), wherein R is linear or branched $C_6$–$C_{10}$alkylene; cyclo-hexylene-methylene or cyclohexylene-methylene-cyclohexylene each unsubstituted or substituted in the cyclohexyl moiety by from 1 to 3 methyl groups; or phenylene or phenylene-methylene-phenylene each unsubstituted or substituted in the phenyl moiety by methyl;

(alk) is $C_2$–$C_4$-alkylene;

$R_5$, $R_5'$ and $R_5''$ are each independently of the other hydrogen or methyl;

$R_6$ and $R_6'$ are each independently of the other selected from the group consisting of a radical —COOY, wherein Y is $C_1$–$C_2$-alkyl, $C_2$–$C_3$-alkyl, which is substituted by hydroxy, amino or N,N-di-$C_1$–$C_2$-alkylamino; a radical —$CH_2CH_2$—O—($CH_2CH_2O$)$_{2-8}$—H; a radical —$C_2$–$C_4$-alkylene-NH—C(O)—O—G wherein —O—G— is the radical of trehalose or a cyclodextrin fragment with a maximum of 8 sugar units each reduced by one hydroxy group; a radical —CO—$NY_1Y_2$, wherein $Y_1$ and $Y_2$ are each independently of the other hydrogen or $C_1$–$C_4$-alkyl which is unsubstituted or substituted by hydroxy, or $Y_1$ and $Y_2$ together with the adjacent N-atom form a N—$C_1$–$C_2$- alkylpiperazino or morpholino ring; and a heterocyclic radical selected from the group consisting of N-pyrrolidonyl, 2- or 4-pyridinyl, 2-methylpyridin-5-yl, 2-, 3-oder 4-hydroxypyridinyl, N-ε-caprolactamyl, N-imidazolyl, 2-methylimidazol-1-yl, N-morpholinyl and 4-N-methylpiperazin-1-yl;

t is 1 and $R_{11}$ is methylene; or a radical of formula

—C(O)—X₃-Alk-,  (8a),

—C(O)—O-Alk'-NH—C(O)—O—(CH₂CH₂O)$_g$—CH₂CH₂—(8b), or

—C(O)—O-Alk'-NH—C(O)—O—G₁—  (8c), wherein (Alk) and (Alk') are each independently of the other $C_2$–$C_4$-alkylene, $X_3$ is —O—, —NH— or —N($C_1$–$C_2$-alkyl)—, g is an integer of from 1 to 3, and —OG₁— is the radical of trehalose or a cyclodextrin fragment with a maximum of 8 sugar units each reduced by one hydroxy group, X is —O— or —NH—, $Q_1$ is a radical of formula

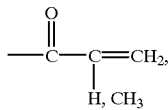

-continued

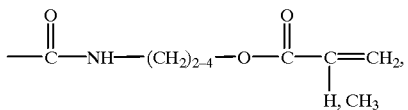

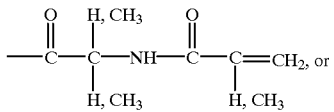

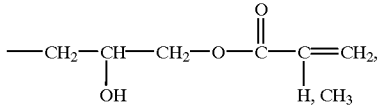

T is a monovalent group that is suitable to act as a polymerization chain-reaction terminator, u is a number from 1 to 2, p and q are each independently of the other an integer from 0 to 99 wherein the sum of (p+q) is an integer from 3 to 99, and n is an integer from 2 to 8.

11. A process for the manufacture of a moulding, which comprises crosslinking an amphiphilic block copolymer of formula (1) according to claim 1 in a mould.

12. A process according to claim 11 wherein the moulding is an ophthalmic moulding and wherein the amphiphilic block copolymer is photo-crosslinked in an ophthalmic mould using actinic radiation.

13. A moulding made by the process according to claim 11.

14. A moulding according to claim 13, which is an ophthalmic moulding.

* * * * *